US011263457B2

(12) United States Patent
Rom

(10) Patent No.: US 11,263,457 B2
(45) Date of Patent: Mar. 1, 2022

(54) VIRTUAL ITEM DISPLAY SIMULATIONS

(71) Applicant: Houzz, Inc., Palo Alto, CA (US)

(72) Inventor: Shay Rom, Tel Aviv (IL)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 16/831,133

(22) Filed: Mar. 26, 2020

(65) Prior Publication Data

US 2020/0311428 A1 Oct. 1, 2020

Related U.S. Application Data

(60) Provisional application No. 62/827,509, filed on Apr. 1, 2019.

(51) Int. Cl.
| | |
|---|---|
| *G06K 9/00* | (2006.01) |
| *G06F 3/01* | (2006.01) |
| *G06F 3/0481* | (2013.01) |
| *G06T 15/20* | (2011.01) |
| *G06T 7/73* | (2017.01) |
| *G06T 19/00* | (2011.01) |
| *G06Q 30/06* | (2012.01) |
| *G06F 3/04815* | (2022.01) |

(52) U.S. Cl.
CPC ......... *G06K 9/00671* (2013.01); *G06F 3/011* (2013.01); *G06F 3/04815* (2013.01); *G06Q 30/0643* (2013.01); *G06T 7/74* (2017.01); *G06T 15/205* (2013.01); *G06T 19/006* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 9,554,064 | B2* | 1/2017 | Dixon | H04N 7/188 |
| 10,937,247 | B1* | 3/2021 | Chuah | G06T 7/70 |
| 2002/0093538 | A1* | 7/2002 | Carlin | G06T 15/10 |
| | | | | 715/778 |
| 2014/0132633 | A1* | 5/2014 | Fekete | G06Q 50/01 |
| | | | | 345/634 |
| 2015/0331970 | A1* | 11/2015 | Jovanovic | G06T 19/006 |
| | | | | 703/1 |
| 2018/0374276 | A1* | 12/2018 | Powers | G06T 19/20 |
| 2019/0033989 | A1* | 1/2019 | Wang | G06F 3/0346 |
| 2020/0218074 | A1* | 7/2020 | Hoover | G02B 27/0172 |
| 2020/0302681 | A1* | 9/2020 | Totty | G06T 7/74 |
| 2021/0082189 | A1* | 3/2021 | Jovanovic | G06T 7/70 |

\* cited by examiner

*Primary Examiner* — Edward Martello
(74) *Attorney, Agent, or Firm* — Schwegman Lundberg & Woessner, P.A.

(57) ABSTRACT

A planar placement system can generate virtual surfaces (e.g., floors, walls) to simulate items in an augmented reality display. The system can generate the virtual surfaces using image feature tracking and plane intersection approaches that create an accurate visual simulation. The items simulated can be variable items that have unit data (e.g., rolls of wallpaper) that can be simulated on the virtual surfaces, and unit data can be displayed and updated in real time or near real time on a mobile device, such as a user's smartphone.

13 Claims, 36 Drawing Sheets

VIRTUAL ITEM DISPLAY SIMULATIONS

PRIORITY APPLICATIONS

This application claims the benefit of priority to U.S. Provisional Patent Application Ser. No. 62/827,509, filed Apr. 1, 2019, the content of which is incorporated herein by reference in its entirety.

TECHNICAL FIELD

Embodiments of the present disclosure relate generally to image manipulation and, more particularly, but not by way of limitation, to image processing and display of virtual items on computer devices.

BACKGROUND

Increasingly, users would like to simulate an object (e.g., chair, table, lamp) in a physical room without having access to the object. For example, a user may be browsing a web store and see a patterned floor tile that the user would like to simulate on their kitchen floor. However, simulation of the patterned floor tile pattern in the user's kitchen requires complex image processing techniques that are difficult and impractical for users to accomplish through mobile devices, which have limited resources (e.g., limited input/output controls, a small screen, limited processing power, limited memory).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, an approach for placement of virtual items (e.g., wallpaper, floor tile), on horizontal and vertical surfaces of a real world environment is disclosed. In some example embodiments, the item places is a variable item that comes in finite real world units (e.g., boxes, rolls). In some example embodiments, the approaches disclose can generate virtual surfaces (e.g., virtual floor, virtual wall) upon which a variable area can be delineated, and in which the virtual items can be displayed for simulation. In some example embodiments, the virtual items can be arranged in a virtual room that is accessed via a vertical wall generated using the vertical plane placement operations.

Figure 1:
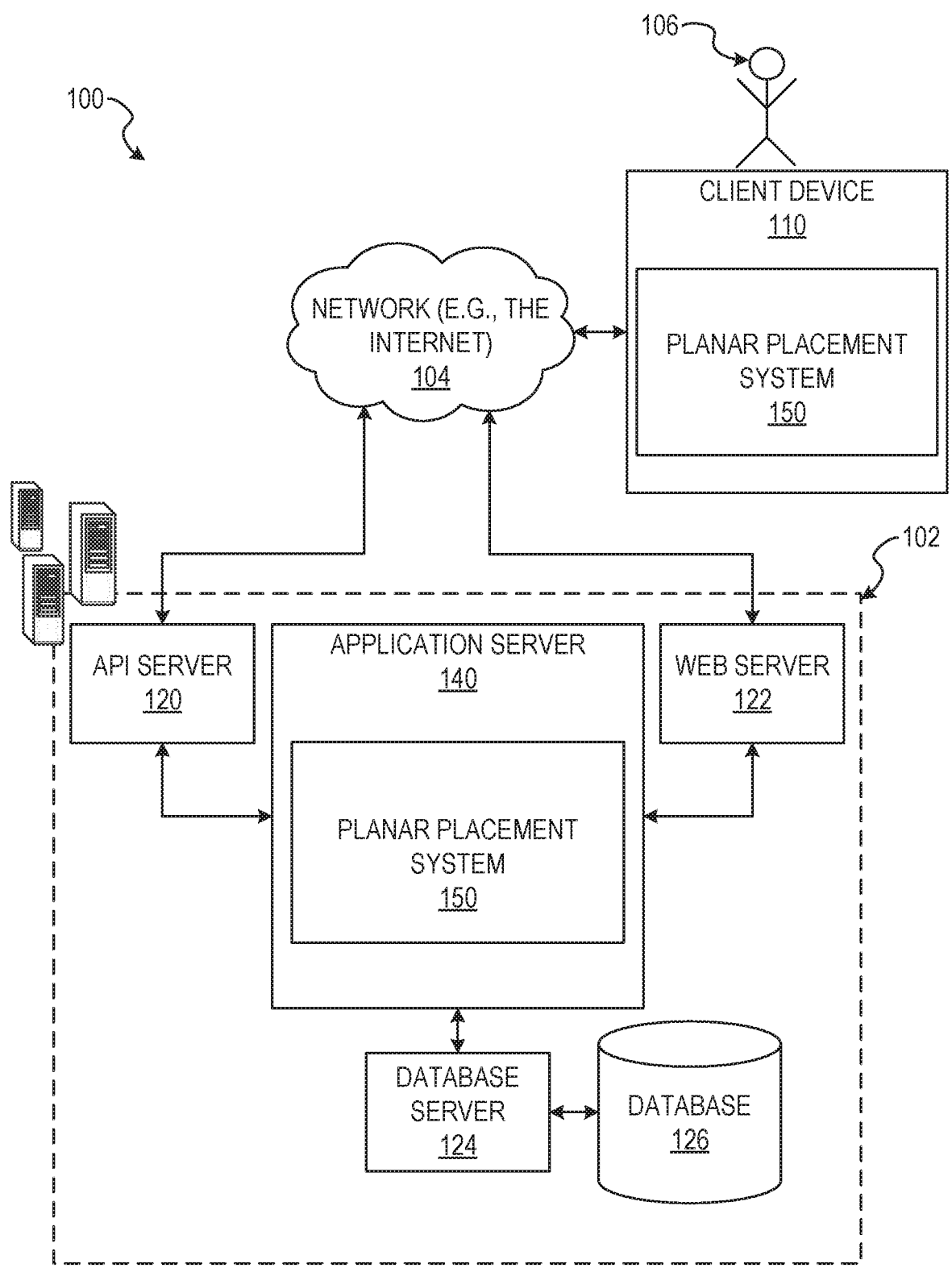
FIG. 1 shows an example network architecture for a physical item replacement system, according to some example embodiments.

With reference to FIG. 1, an example embodiment of a high-level client-server-based network architecture 100 is shown. A networked system 102, in the example forms of a network-based rendering platform that can provide server-side rendering via a network 104 (e.g., the Internet or wide area network (WAN)) to one or more client devices 110. In some implementations, a user (e.g., user 106) interacts with the networked system 102 using the client device 110. The client device 110 may execute the planar placement system 150 as a local application or a cloud based application (e.g., through an Internet browser).

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like. In some embodiments, the client device 110 is the recording device that generates the video recording and also the playback device that plays the modified video recording during a playback mode. In some embodiments, the recording device is a different client device than the playback device, and both have instances of the planar placement system 150 installed. For example, a first client device using a first instance of a dynamic virtual room modeler may generate a simulation, and a second client device using a second instance of a dynamic virtual room modeler may receive the simulation over a network and display the simulation via a display screen. The instances may be platform specific to the operating system or device in which they are installed. For example, the first instance may be an iOS application and the second instance may be an Android application.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (WI-FI®) network, a Worldwide Interoperability for Microwave Access (WiMax) network, another type of network, or any suitable combination thereof.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server 140. The application server 140 can host a dynamic virtual environment modeler server 151, which can comprise one or more modules or applications and each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by planar placement system 150. Additionally, in some embodiments, the model data may be cached locally on the client device 110. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example.

Figure 2:
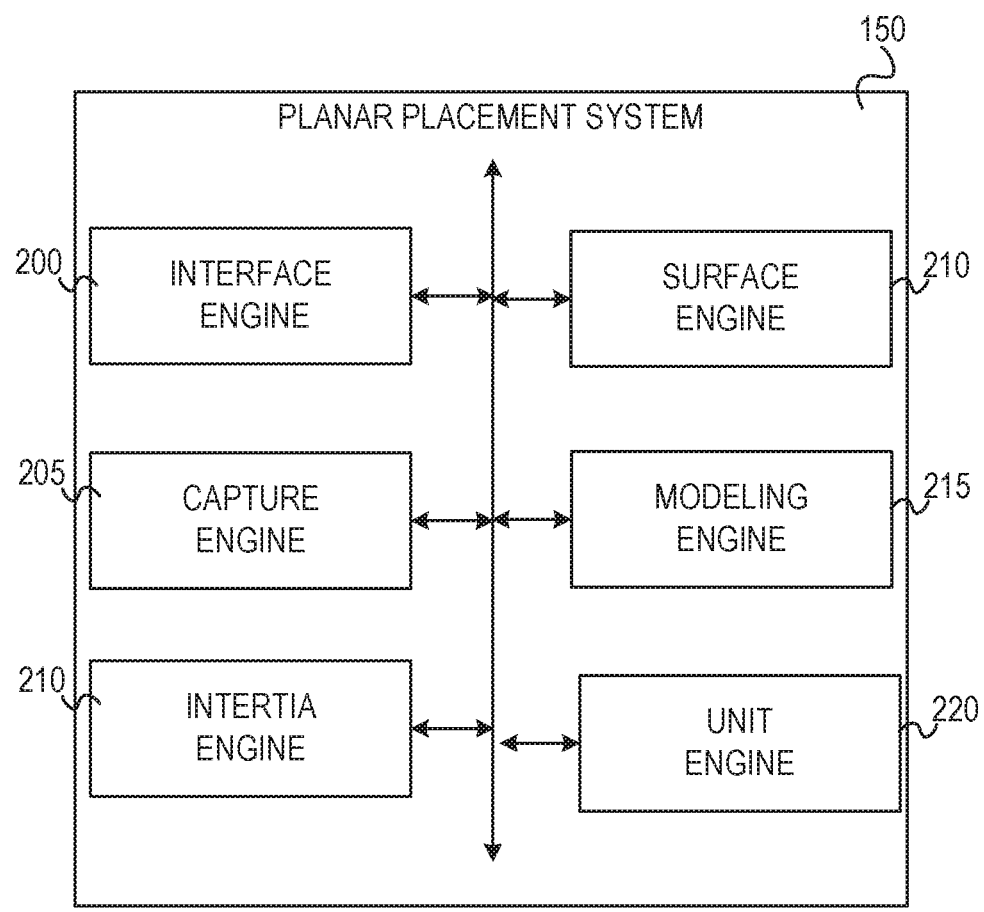
FIG. 2 displays internal functional engines of a planar placement system, according to some example embodiments.

FIG. 2 displays internal functional engines of a planar placement system 150, according to some example embodiments. As illustrated, the planar placement system 150 comprises an interface engine 200, a capture engine 205, a surface engine 210, a modeling engine 215, and a united engine 220.

Figure 3:
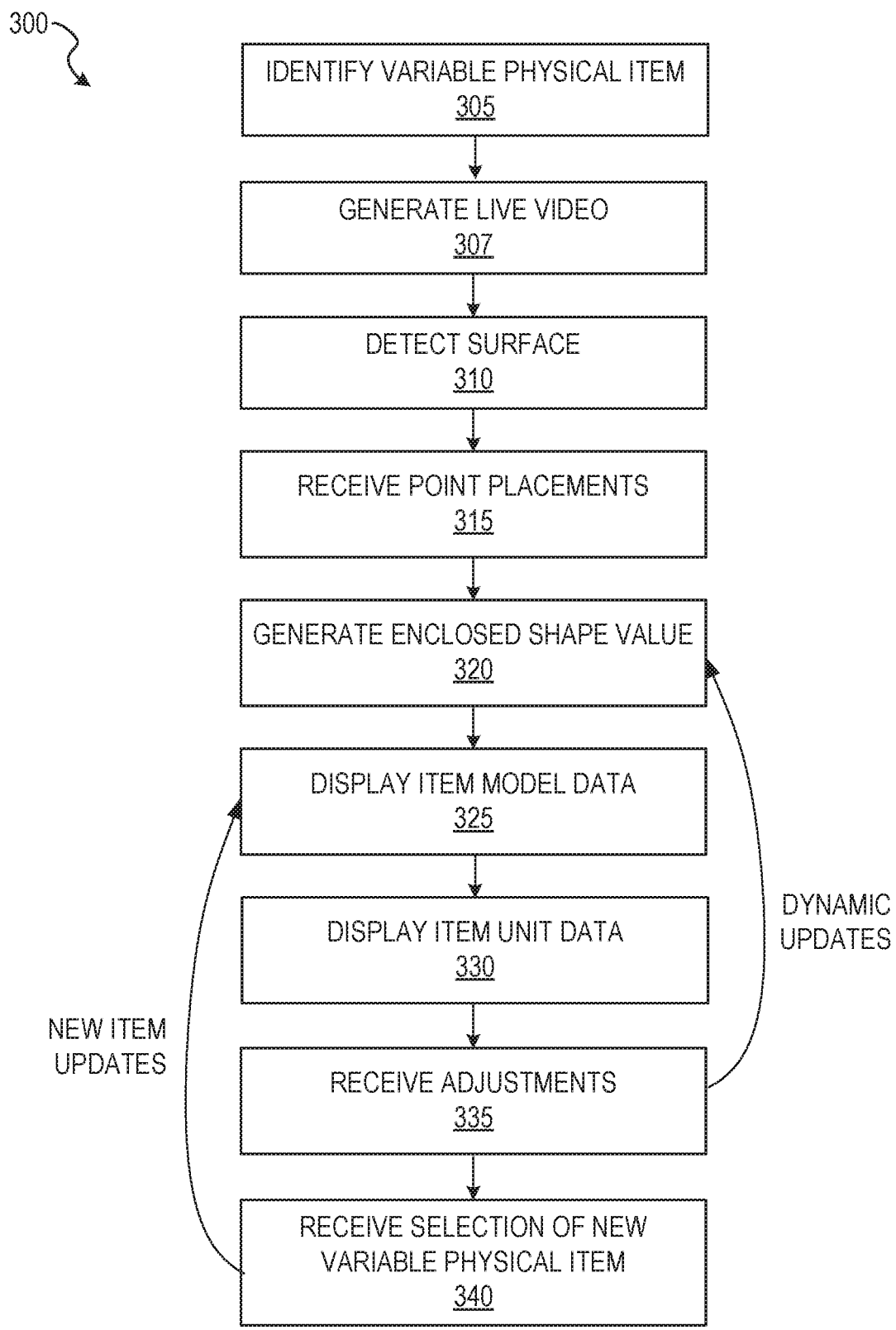
FIG. 3 shows a flow diagram of a method for implementing virtual item simulation using planar placement system, according to some example embodiments.
Figure 4:
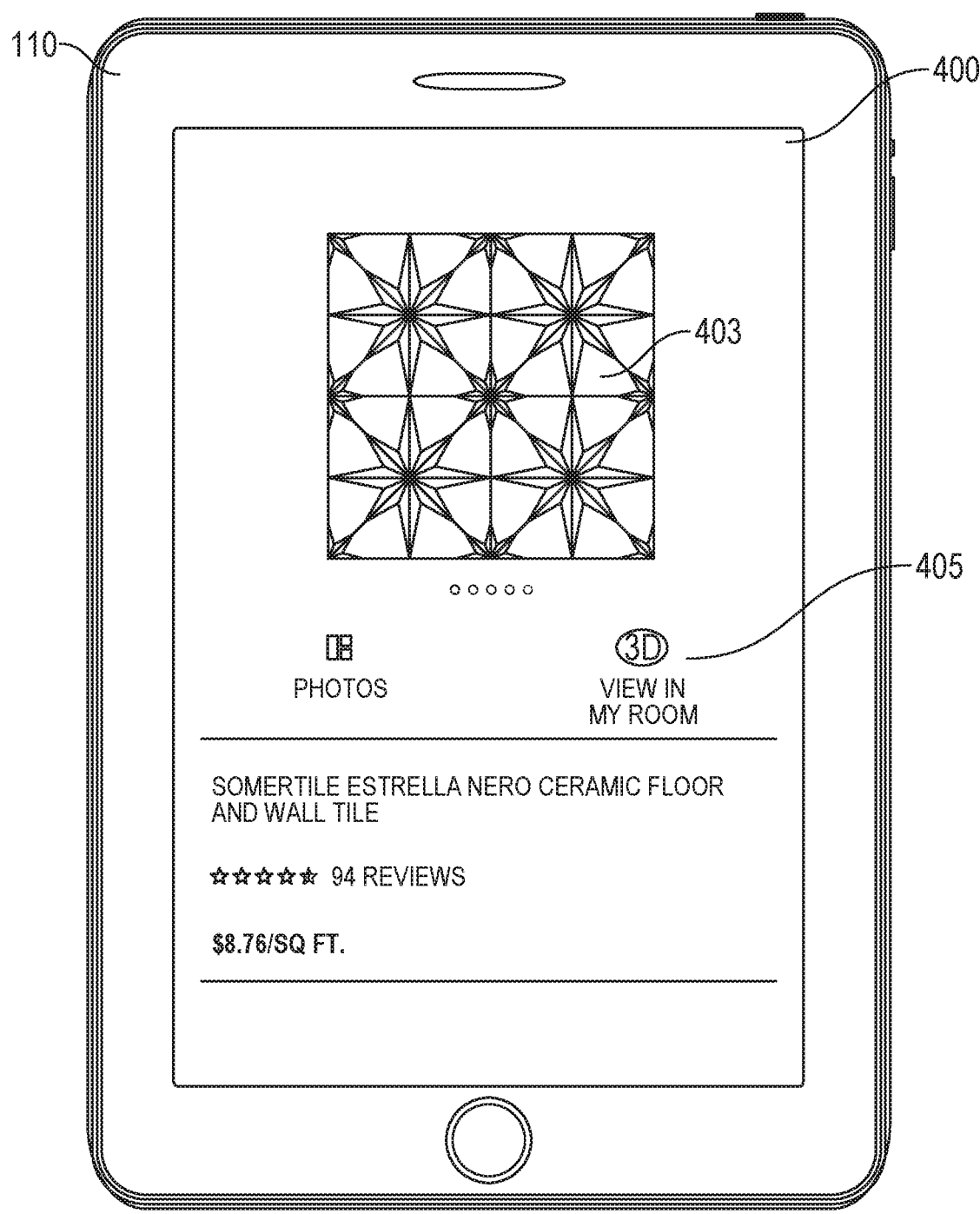
FIG. 4 shows an example user interface displaying an example virtual item for simulation, according to some example embodiments.

FIG. 3 shows a flow diagram of a method 300 for implementing virtual item simulation using planar placement system 150, according to some example embodiments. At operation 305, the interface engine 200 identifies a variable item for simulation. For example, with reference to FIG. 4, the user of a client device 110 is viewing a user interface 400 of a website or mobile app, which is displaying a patterned item 403. The user may select a simulation button 405 ("View in my room") to initiate simulation of the patterned item 403 in the user's environment (e.g., a room in which the user is holding client device 110).

At operation 307, the capture engine 205 generates live video, such as an image sequence that is dynamically captured via an image sensor on the back side of the client device 110. The captured video is dynamically displayed on the display screen of the client device 110 in real-time or near real-time.

At operation 310, the surface engine 210 detects a surface within the live video. The surface can be a horizontal surface (e.g., a floor, a ceiling), or a vertical surface (e.g., a wall). In some example embodiments, the type of surface to be detected is preconfigured based on the item selected for simulation. For example, if a floor tile or floor lamp is selected, the surface engine 210 may initiate feature-based surface detection that can efficiently detect horizontal surfaces, such as floors or ceilings, which are generally feature rich (e.g., different edges, patterns, or lines that are detectable using computer vision schemes, such as edge detection, blob detection). Whereas, for example, if a sconce lamp or a wallpaper item is selected for simulation, the surface engine 210 may detect a physical wall and then generate a virtual wall aligned to the physical wall, as discussed in further detail below.

In some example embodiments, such as in the example in FIG. 3, the item 403 can be applied to a floor or a wall. In those example embodiments, the interface engine 200 may prompt the user to select between a "Apply to Floor" button or a "Apply to Wall" button to initiate a feature-based approach (e.g., if the floor option is selected) or a virtual wall approach (e.g., if the wall option is selected).

At operation 315, the modeling engine 215 receives point placements. For example, at operation 315, the planar placement system 150 receives placement of a first point on the ground as depicted in the live video, followed by placement of a second point on the ground, followed by placement of one or more additional points. As the points are placed, their real-world positions are tracked in three dimensions (x, y, z) using the image features (e.g., location within the image, 2D image feature tracking, SIFT data), and inertial sensor information (e.g., accelerometer, gyroscope) generated by the client device. The modeling engine 215 then connects the plurality of points to create an enclosed shape (e.g., a patch on the virtual surface) on the physical ground as viewed in the live video of the mobile device.

At operation 320, the modeling engine 215 generates an enclosed shape value. For example, at operation 320, the modeling engine 215 calculates the area of the enclosed shape created by the point placements. The enclosed shape area can be calculated using two-dimensional geometry, and the enclosed shape area value is in real-world dimensions, such as meters (e.g., for a single length) or square meters (e.g., for an area). The modeling engine 215 uses the image feature tracking information and the inertial tracking information (e.g., accelerometer, gyro data) to create scaling factors from the virtual shape size to real world size, thereby generating a real-world value for the area enclosed in the shape.

At operation 325, the modeling engine 225 updates the display of the client device to display virtual item model data. For example, each frame of the live video is overlaid with a render of the selected virtual item to simulate the virtual item in the live video. In some example embodiments, the item model data (e.g., 3D model, render 2D render data) is overlaid on a higher layer of the video (e.g., the video data being on a lower layer such that the model data covers the lower layer objects without deleting them), or integrating the virtual item into the video data (e.g., merging a render of the virtual item into the video data to replace pixel values of a given frame), according to some example embodiments. The resulting live video is an augmented reality displaying the selected item integrated into the real-world environment as depicted in the live video.

At operation 330, the unit engine 220 generates item unit data for display with the virtual item data as simulated in the live video. The item unit data describes how many units (e.g., boxes, rolls) of the item are needed to cover the enclosed shape area. For example, the live video is updated to display the kitchen with the simulated item (e.g., the patterned kitchen tiles), and further updated with information indicating how many boxes of the tile are required to cover the enclosed area as delineated by the points placed in the live video. In some example embodiments, database 126 stores item unit data for a given item, and the unit engine 220 divides the area value generated at operation 320 by the unit value retrieved from database 126. For example, if the simulated patch of kitchen floor covered with the virtual tile is 10 square meters, and the kitchen floor tile is shipped in with 3.5 square meters per box, then at operation 330 generates a notification indicating that three boxes of the selected kitchen tile would be required to tile the selected area within the user's real-world kitchen.

At operation 335, the modeling engine 215 receives adjustments to the enclosed shape, and updates the display per the adjustments. For example, at operation 335, the user uses the touchscreen to change one of the point placements, which causes the area value of the enclosed shape to change (e.g., the user moves two points to change the area shape to a larger shape). In response to the adjustments, the method 300 automatically loops to operation 320 where the new enclosed shape value is generated, followed by operation 325 in which new render data is generated for the new enclosed area, followed by updating the new item data values (e.g., more or less units/rolls of wallpaper) for the new enclosed shape value.

At operation 340, the interface engine 200 receives selection of a new variable physical item for simulation. For example, at operation 340, the user selects new tile pattern for simulation in the pre-configured enclosed shape in the kitchen. In response to selection of the new item being selected, the method 300 loops to operation 325 in which a new image tile pattern is applied to the virtual surface, and new unit data for the new tile pattern (e.g., which may come in different packaging, such as one-roll of checkered vinyl pattern that covers 100 square feet, with different prices per unit).

Figure 5:
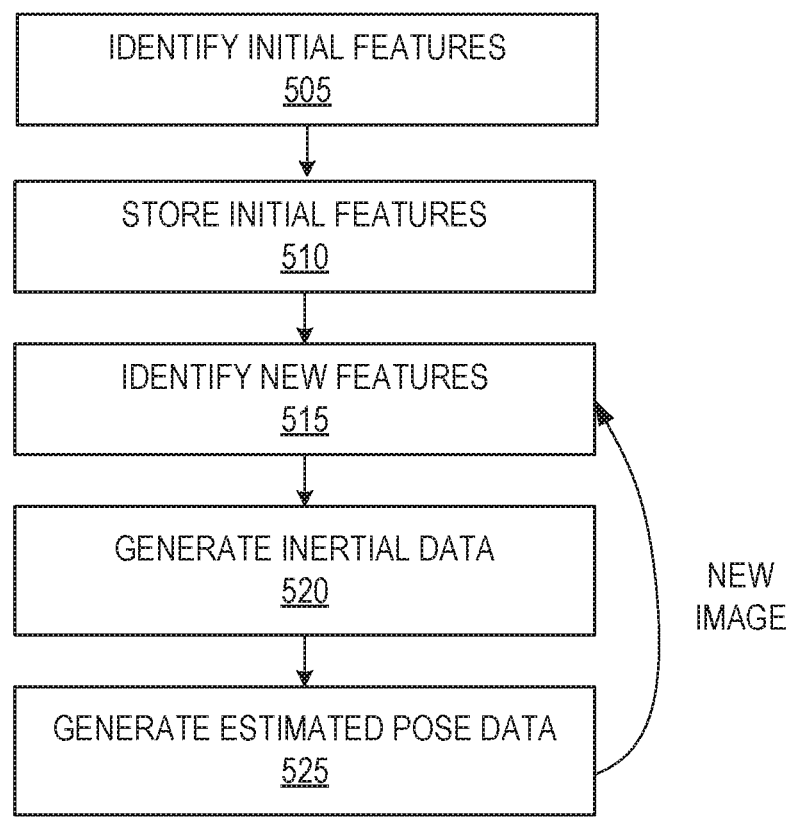
FIG. 5 shows a flow diagram of an example method for tracking features and updating camera pose data, according to some example embodiments.

FIG. 5 shows a flow diagram of an example method 500 for tracking features and updating camera pose data, according to some example embodiments. The method 500 is an example Visual Inertial Odometry (VIO) sub-routine implemented by the modeling engine 215 to track features in the live video to receive the point placements, generate the enclosed area, and continuously update the virtual camera used to render the virtual item data so that the rendered data aligns with the real world objects in the live video. That is, for example, as the client device 110 moves in real life three feet westward, the modeling engine 215 detects the movement of the client device 110 and moves the virtual camera three feet in the same direction so that the rendered items remain stationary as the virtual camera moves, thereby creating an augmented reality experience, whereby the simulated virtual item is accurately overlaid and "pinned to" image objects in the live video (e.g., a real world wall, a real world floor).

At operation 505, the modeling engine 215 identifies initial features in one or more images of a video sequence. For example, the modeling engine 215 attempts to track points across one or more frames using feature tracking schemes, such as SIFT. In some example embodiments, when three or more image features are trackable using the tracking schemes, the three or more image features are stored at operation 510 as initial feature or ground truth data for later analysis (e.g., to new feature data).

At operation 515, the tracking engine 213 identifies new features in new image data. For example, the new image data could be newly generated frames of live video, and the new features are detected and analyzed to match them to the initial features. For example, if the initial feature of operation 505 is an ink spot on carpet, the new feature data of operation 515 is the ink spot from a different perspective (e.g., due to the client device moving to view the ink spot from a different angle or real-world position).

At operation 520, the inertial engine 207 generates inertial data using one or more inertial sensors of the client device (e.g., an accelerometer, a gyroscope). For example, the inertial data generated at operation 520 can describe the movement of the client device from a first position (in which a first image was generate that includes initial features of operation 505) to a second position (in which a second or later image was generated that depicts new features of operation 515).

At operation 525, the modeling engine 215 generates an estimated camera pose based on image data and/or the inertial data. For example, at operation 525 the modeling engine 215 implements key-frame based Simultaneous Localization and Mapping (SLAM) with the inertial data, where the inertial data is used to adjust the location probability model of the SLAM data in non-linear optimization. The updated camera pose data describes a transformation from the first position to the second position, and the transformation data is used to update the virtual camera position so that the virtual camera and the client device camera share the same perspective. In this way, a surface can be detected (e.g., ground detection), points tracked as placements, and new virtual model data can be rendered by the virtual camera that has a position that is updated for each frame of the live video to create a realistic augmented reality simulation in the live video.

Figure 6A:
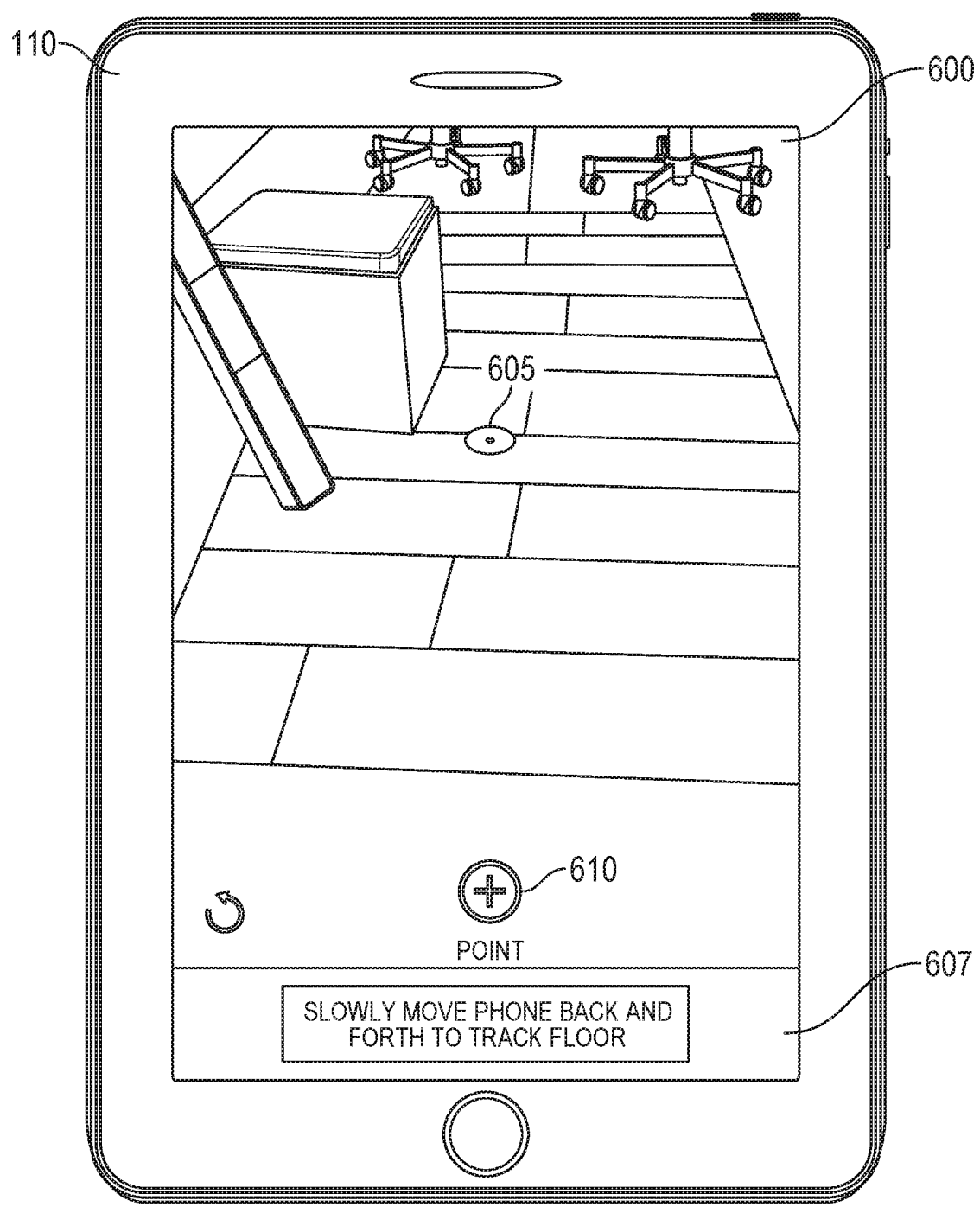
FIGS. 6A-6F show example user interfaces for implementing virtual item modeling using the planar placement system, according to some example embodiments.
Figure 6B:
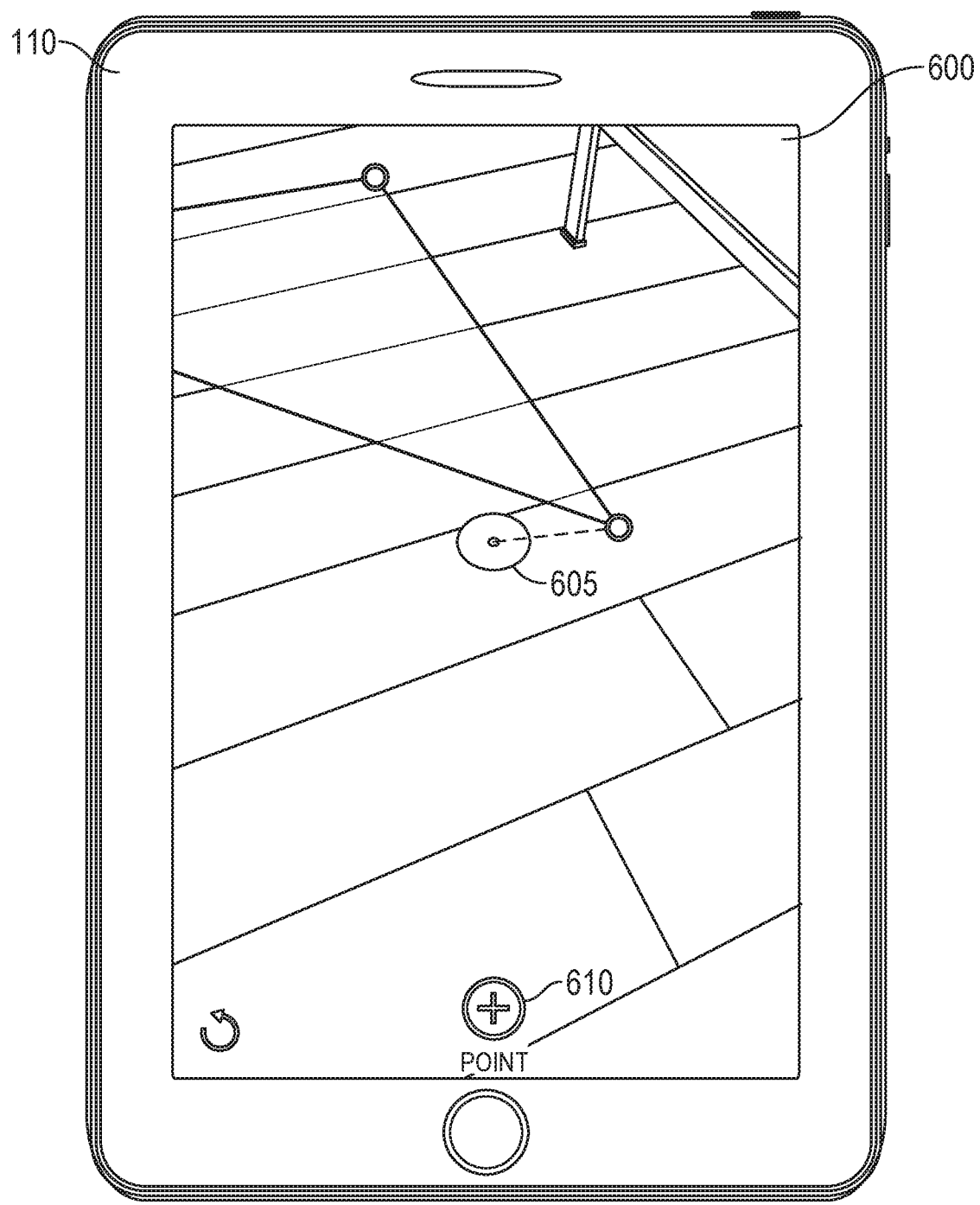

FIGS. 6A-6F show example user interfaces for implementing virtual item modeling using method 300 (e.g., operations 307-335) and method 500), according to some example embodiments. In the example figures, the client device 110 includes a backside camera (not depicted) that generates live video which is displayed in real-time or in near real time on the display device of the client device 110 (e.g., a touch screen). With reference to FIG. 6A, system 150 on the client device 110 can first detect the floor using prompt 607 (e.g., "slowly move phone back and forth to track phone", or similar message). As the user scans the floor side to side, the tracking engine 213 can identify co-planar image features, generate a virtual floor using a virtual camera, and update the virtual camera position using point tracking as discussed above (e.g., method 500, FIG. 5).

The user interface 600 further prompts the user to place points using a point indicator 605 (e.g., reticle). The point indicator 605 is a reticle element projected (e.g., rendered) on the virtual floor as the virtual floor is aligned to the real-world floor, which creates an augmented reality display appearing to show the point indicator 605 moving along the real-world floor. When the point indicator 605 is at the desired location within the real-world room (as depicted in the live video), the user selects add point button 610 to create a placed point. Additional placed points can be added by moving the point indicator 605 to a new position as tracking is implemented to capture the relative positioning of the points with respect to one another. For example, turning to FIG. 6B, the point indicator 605 is moved to new locations on the floor and the button 610 is selected multiple times to create new vertices of an arbitrary shape.

Figure 6C:
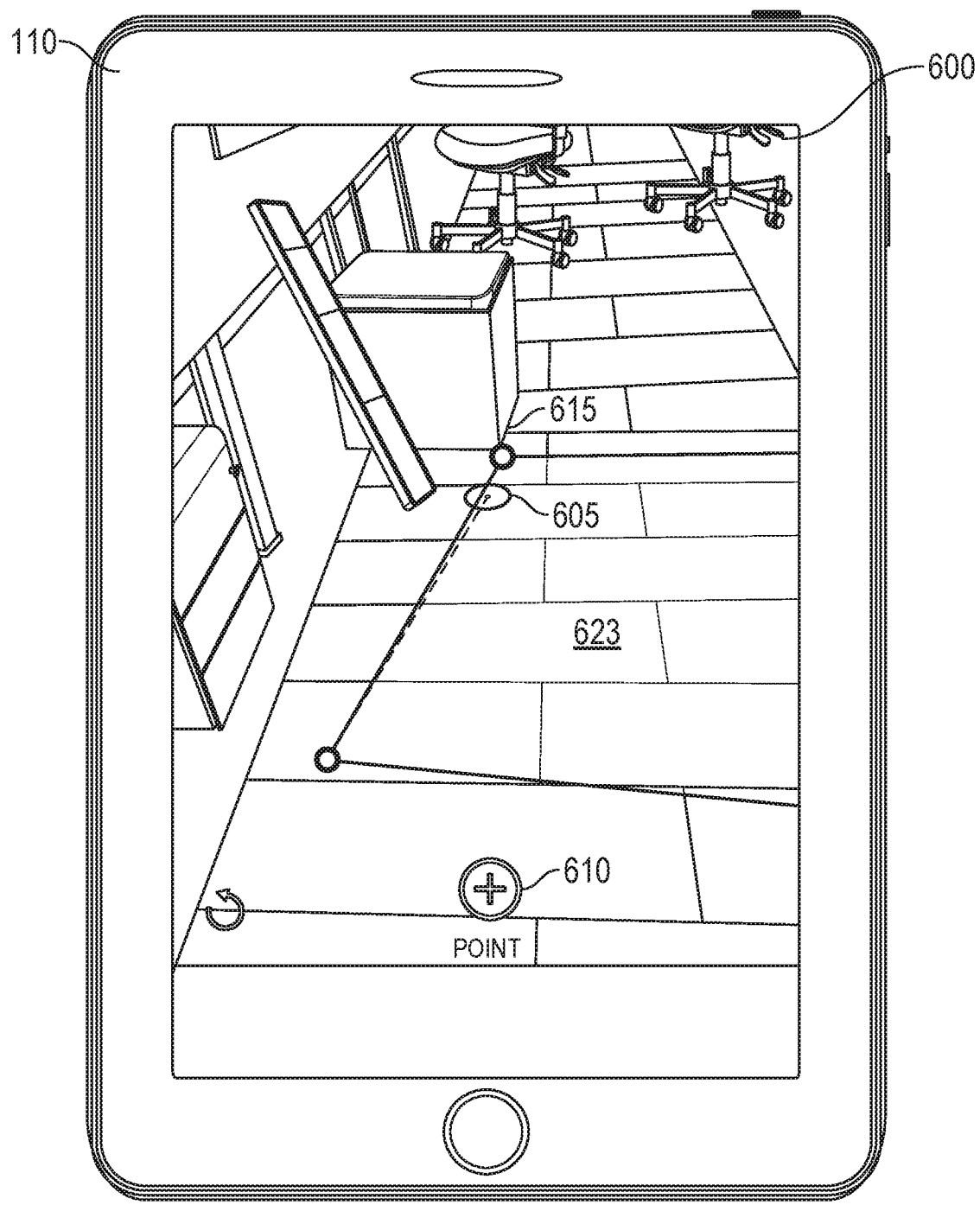

Turning to FIG. 6C, when the point indicator 605 nears the original point 615 the point indicator 605 snaps to position itself over 615 and an arbitrary enclosed shape 623 is generated for display. The shape 623 is a portion of the virtual floor generated by the virtual camera used to render the placed points, shape data, and model data.

Figure 6D:
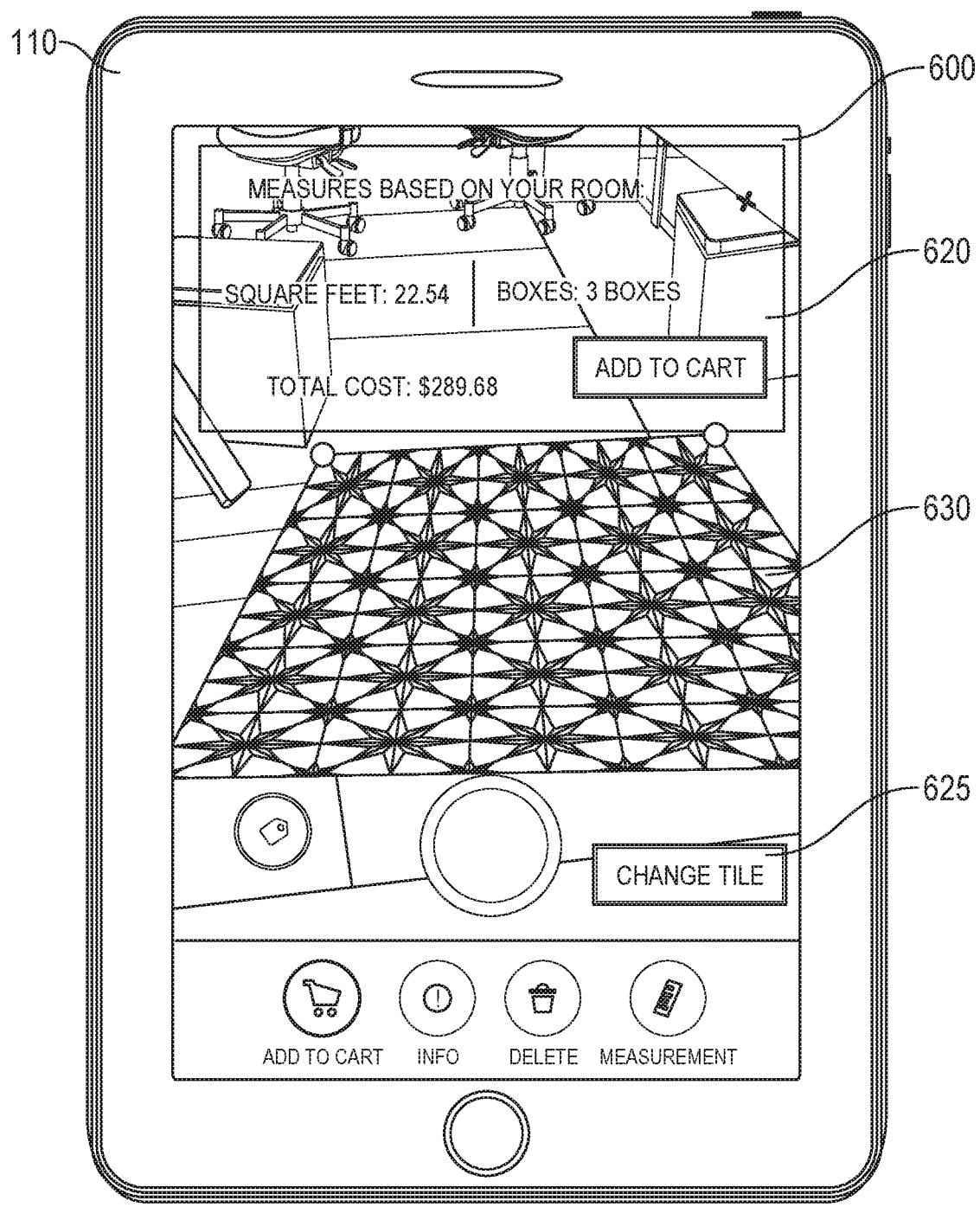
Figure 6E:
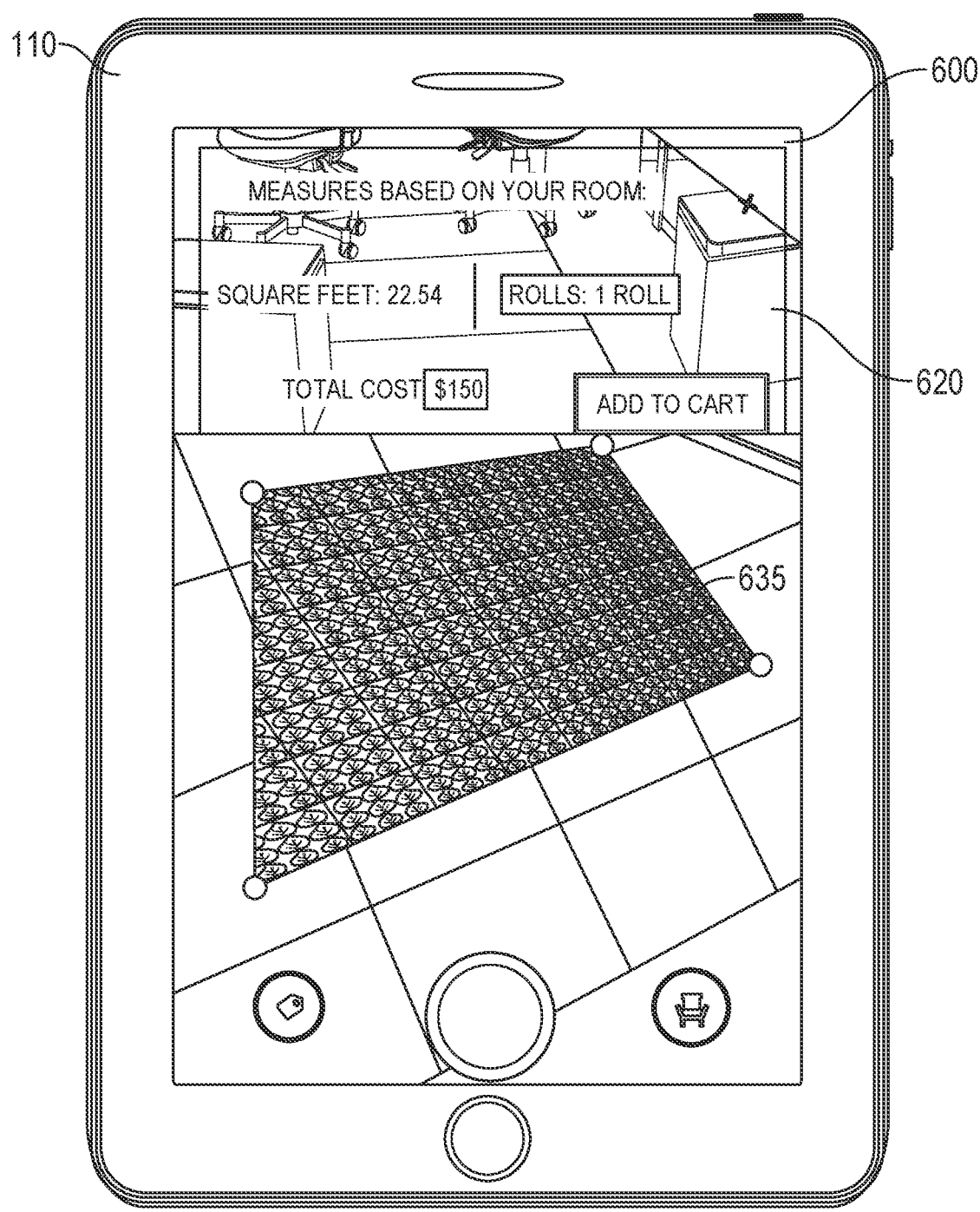

Turning to FIG. 6D, in response to the shape 623 being generated, a virtual item can be rendered using the shape 623. For example, the 3D model data of the item 403 (FIG. 4) can be generated within the limits of the shape 623, as displayed by texture 630 (e.g., render data of a modeling texture or skin applied to the area of shape 623). Further, as the user moves the client device 110, the virtual camera position can be updated thereby allowing the user to view the selected item in their own real-world environment. FIG. 6D further shows variable data within user interface window 620. The variable data can include how many boxes of the item would be needed to cover the area, the square footage or other measurements of the arbitrary shape, and the total cost to purchase the boxes, and other elements such as an "Add to Cart" button. Additionally, according to some example embodiments, the user can select a button 625 which allows the user to choose a new tile for depiction in the real-world environment without re-creating the arbitrary shape (e.g., operation 335, FIG. 3). For example, upon the user selecting the change tile button 625, the planar placement system 150 may receive an additional item selection (e.g., a different floor tile) and apply a new image texture 635 within the arbitrary shape 623 as illustrated in FIG. 6E. Further, upon the new item being selected, the window 620 is updated to display updated unit data for the new item, which may be stored in different units (e.g., 10 square yards per box) and have a different price per box.

Figure 6F:
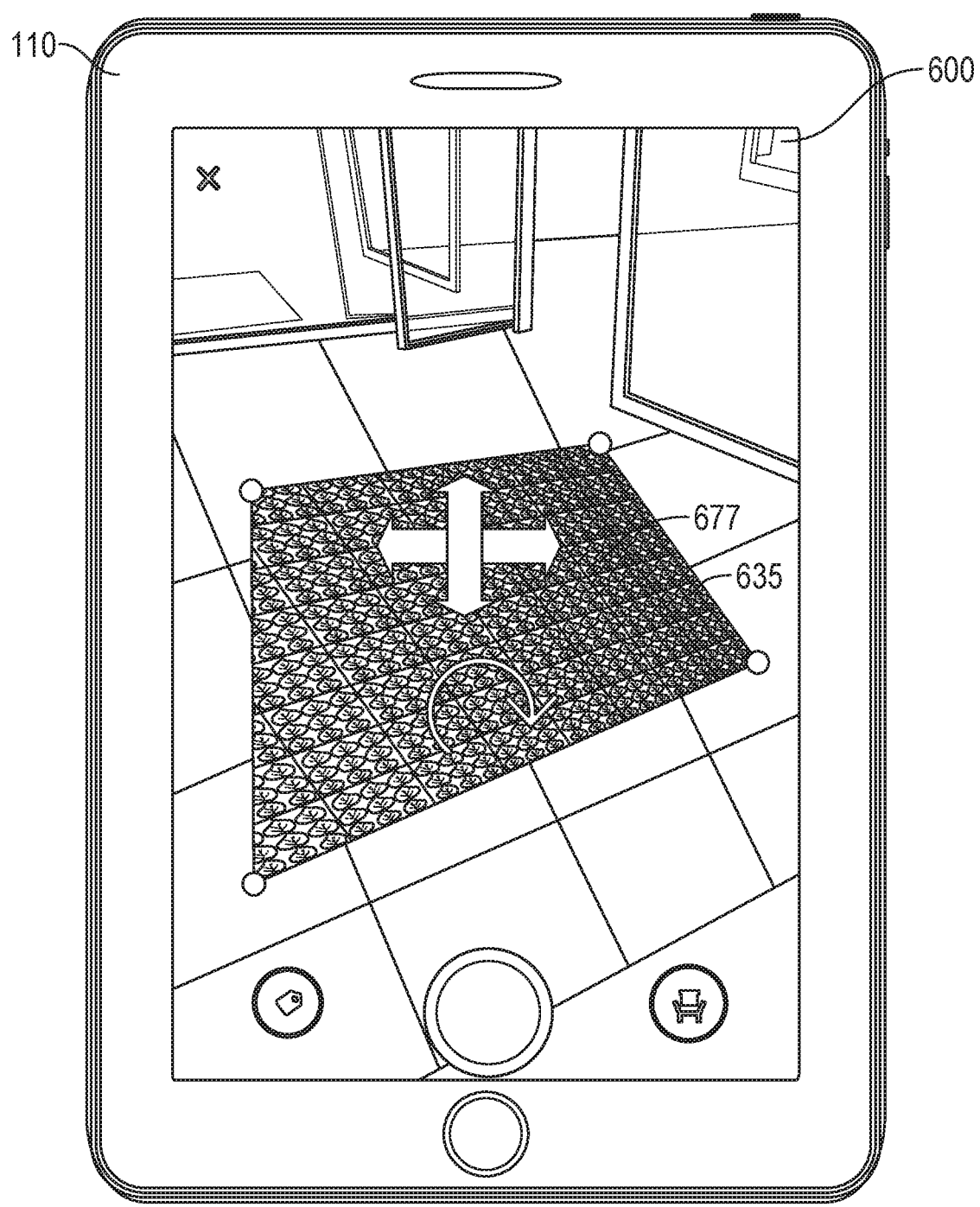

FIG. 6F shows an example user interface 600 for receiving adjustments of a variable item, according to some example embodiments. In the example of FIG. 6F, the user performs gestures such as movement of the placed points, pinch-and-zoom, rotations, etc. to change the area of the shape 677. In response to the shape 677 being updated, the image texture 635 is regenerated to fit within the shape 623, and the window 620 can likewise be updated.

Figure 7:
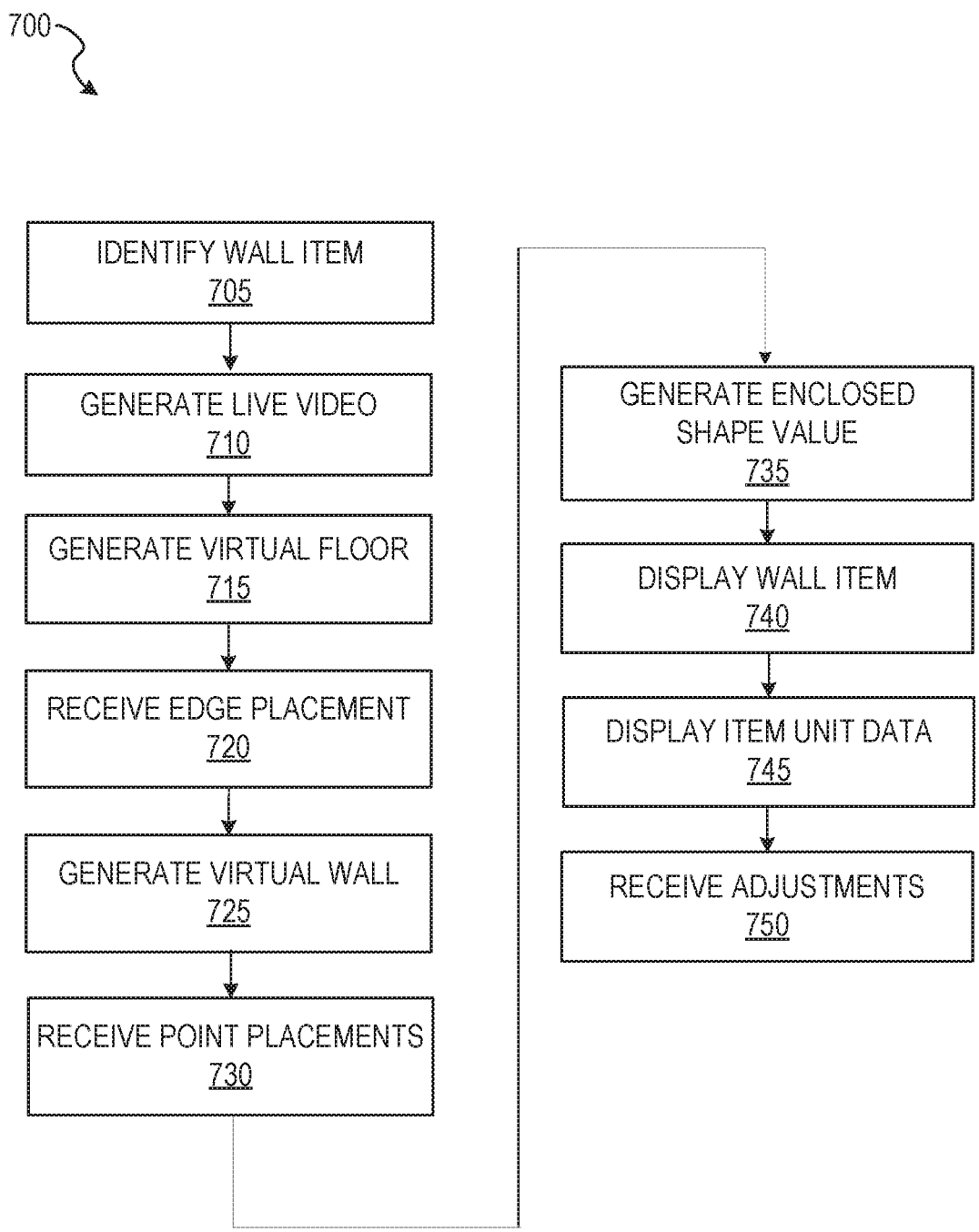
FIG. 7 shows a flow diagram of a method for implementing virtual wall item simulation using the planar placement system, according to some example embodiments.

FIG. 7 shows a flow diagram of a method 700 for implementing virtual wall item simulation using the planar placement system 150, according to some example embodiments. At operation 705, the interface engine 200 identifies a wall item for simulation. For example, the user selects a wallpaper, painting, or wall lamp (e.g., sconce) to simulate on the wall.

At operation 710, the capture engine 205 generates live video, such as an image sequence that is dynamically captured via an image sensor on the backside of the client device 110. The captured video is dynamically displayed on the display screen of the client device 110 in real-time or near real-time, according to some example embodiments.

At operation 715, the surface engine 210 detects a horizontal surface within the live video and the modeling engine 215 generates a virtual floor that is aligned with image features of the detected surface.

At operation 720, the surface engine 210 receives placement of an edge to indicate an intersection of the real-world wall and the real-world floor. For example, after the virtual floor is generated for the real world floor depicted in the live video, the user of the client device indicates where the real world floor and the real-world wall intersect in the live video using edge placement touch screen interactions, such as indicating points, placing a line, or placing a plane as described in further detail with reference to FIG. 8A to FIG. 11.

At operation 725, the modeling engine 215 generates a virtual wall using the edge placement data. For example, after the user indicates the edge where the real world floor and the real world wall intersect, the modeling engine 215 generates a virtual wall that is orthogonal to the virtual floor and extends upward from the virtual floor.

At operation 730, the modeling engine 215 receives point placements on the wall. For example, at operation 730, the modeling engine 215 receives placement of a first point on the wall as depicted in the live video, followed by placement of a second point on the wall, followed by placement of one or more additional points. As the points are placed, their real-world positions are tracked in three dimensions (x, y, z) using the image features (e.g., location within the image, 2D image feature tracking, SIFT data), and inertial sensor information (e.g., accelerometer, gyroscope) generated by the client device, as discussed with reference to FIG. 5 above. The modeling engine 215 then connects the plurality of points to create an enclosed shape (e.g., a patch on the virtual surface) on the virtual wall. In some example embodiments, the generated enclosed shape is transparent but outlined on the wall to indicate where the rendered wall virtual item will be depicted (e.g., to indicate where the patch of wall paper will be displayed). Alternatively, in some example embodiments, a single point placement is received; for example, where the item to be simulated need only a single virtual point to be positioned (e.g., a single point indicating where a framed painting should be simulated, or a sconce should be simulated).

At operation 735, the modeling engine 215 generates an enclosed shape value. For example, at operation 735, the modeling engine 215 calculates the area of the enclosed shape created by the point placements. The enclosed shape area can be calculated using two-dimensional geometry, and the enclosed shape area value is in real-world dimensions, such as meters (e.g., for a single length) or square meters (e.g., for an area). The modeling engine 215 uses the image feature tracking information and the inertial tracking information (e.g., accelerometer, gyro data) to create scaling factors from the virtual shape size to real world size, thereby generating a real-world value for the area enclosed in the shape.

At operation 740, the modeling engine 225 updates the display of the client device with the virtual wallpaper model data. For example, each frame of the live video is overlaid with a render of the selected virtual wallpaper to simulate the virtual wallpaper in the live video. In some example embodiments, the wallpaper model data (e.g., 3D model, render 2D render data) is overlaid on a higher layer of the video (e.g., the video data being on a lower layer such that the model data covers the lower layer objects without deleting them), or integrating the virtual item into the video data (e.g., merging a render of the virtual item into the video data to replace pixel values of a given frame), according to some example embodiments. The resulting live video is an augmented reality displaying the selected wallpaper integrated into the real-world environment as depicted in the live video.

At operation 745, the unit engine 220 generates item unit data for display with the virtual wallpaper data as simulated in the live video within the enclosed shape. The item unit data describes how many units (e.g., boxes, rolls) of the wallpaper are needed to cover the enclosed shape area. For example, the live video is updated to display the bedroom with the simulated item, e.g., the floral wallpaper, and further updated with information indicating how many boxes of the floral wallpaper are required to cover the enclosed area as delineated by the points placed in the live video. In some example embodiments, database 126 stores item unit data for a given item, and the unit engine 220 divides the area value generated at operation 735 by the unit value retrieved from database 126. For example, if the simulated patch of wall covered with the virtual wallpaper is 10 square meters, and the wallpaper is shipped in rolls of 3.5 square meters, then at operation 330 generates a notification indicating that three rolls of the selected wallpaper would be required to wallpaper the selected area within the user's real-world room.

At operation 750, the modeling engine 215 receives adjustments to the enclose shape, and updates the display per the adjustments. For example, at operation 750, the user uses the touchscreen to change one of the point placements that cause the area value of the enclosed shape to change (e.g., the moves two points to change the area shape to a larger shape). In response to the adjustments, the method 700 automatically loops to operations 735-745, as discussed above (FIG. 3).

Figure 8A:
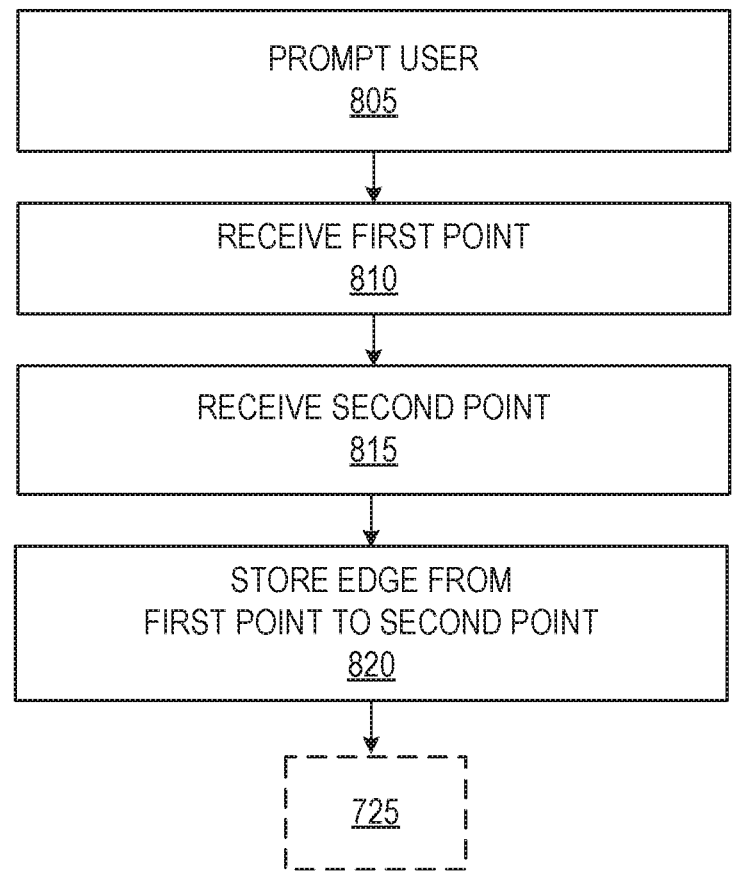
FIGS. 8A-8C illustrate example methods for edge data generation, according to some example embodiments.
Figure 8B:
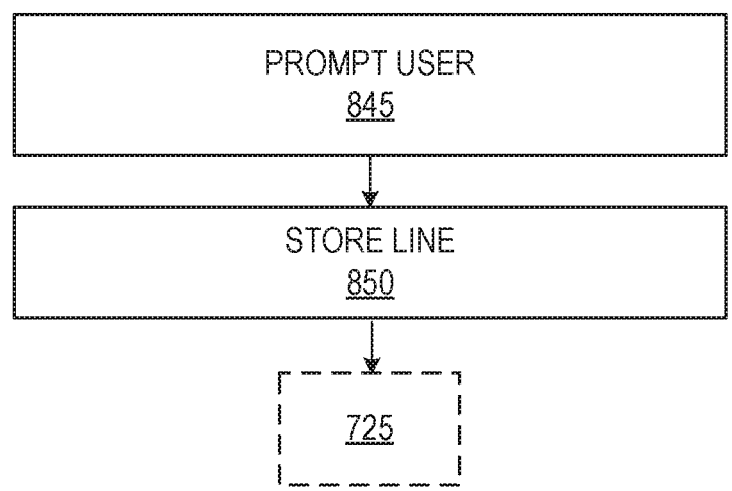
Figure 8C:
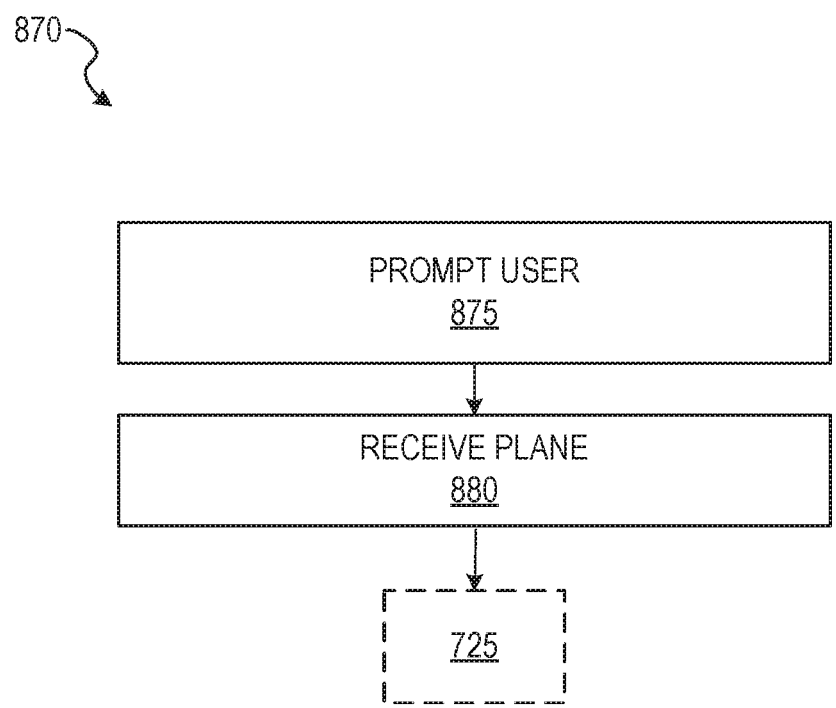

FIGS. 8A-8C illustrate example methods for edge data generation, according to some example embodiments. Each of the methods illustrated in FIGS. 8A-8C can be implemented as a subroutine of operation 720, in which the method is called, operations are performed, and data is returned for further processing (e.g., edge data is stored and operation 725 of method 700 uses the returned data).

FIG. 8A shows a flow diagram of an example method 800 for receiving edge placement using a plurality of points to indicate an edge for the vertical wall, according to some example embodiments. At operation 805, the surface engine 210 prompts the user. For example, with reference to the user interface 900 in FIG. 9A, a notification 905 including the text "Tap to Place" is displayed. The user can then move the client device (not depicted in FIG. 9A) such that the reticle 910 is along the intersection of the real world wall 915 and the real world floor 920, as depicted in the live video of user interface 900.

At operation 810, the surface engine 210 receives the first point. For example, with reference to FIG. 9A, when the reticle 910 is over the intersection of the real world wall 915 and the real world floor 920, the user taps on the reticle 910 to store the first point. Upon tapping on the reticle 910, a ray that is normal to the backside of the client device (e.g., normal to the front a virtual camera used to generate the virtual wall and floor) is projected out to the virtual floor position, and the horizontal location (e.g., X/Y coordinates) on the virtual floor is stored as the first point. In some example embodiments, upon the live video being generated and displayed on the client device, a ray is cast on every frame of the live video to place the reticle, and upon tapping upon the reticle that frame's current reticle position per the that frame's ray is stored as the first point. Additional points can likewise be added in the similar manner (e.g., projecting the ray for every frame and storing the position in response to taps).

In operation 815, the surface engine 210 receives a second point. For example, with reference to FIG. 9B, the client device is rotated clockwise so the reticle 910 is at a different point along the intersection of the real world wall 915 and the real world floor 920. While the reticle 910 is at the different point, the user then taps on the reticle 910 (e.g., the area on the touch screen of the client device at which the reticle 910 is being displayed) to store the second point.

Figure 9A:
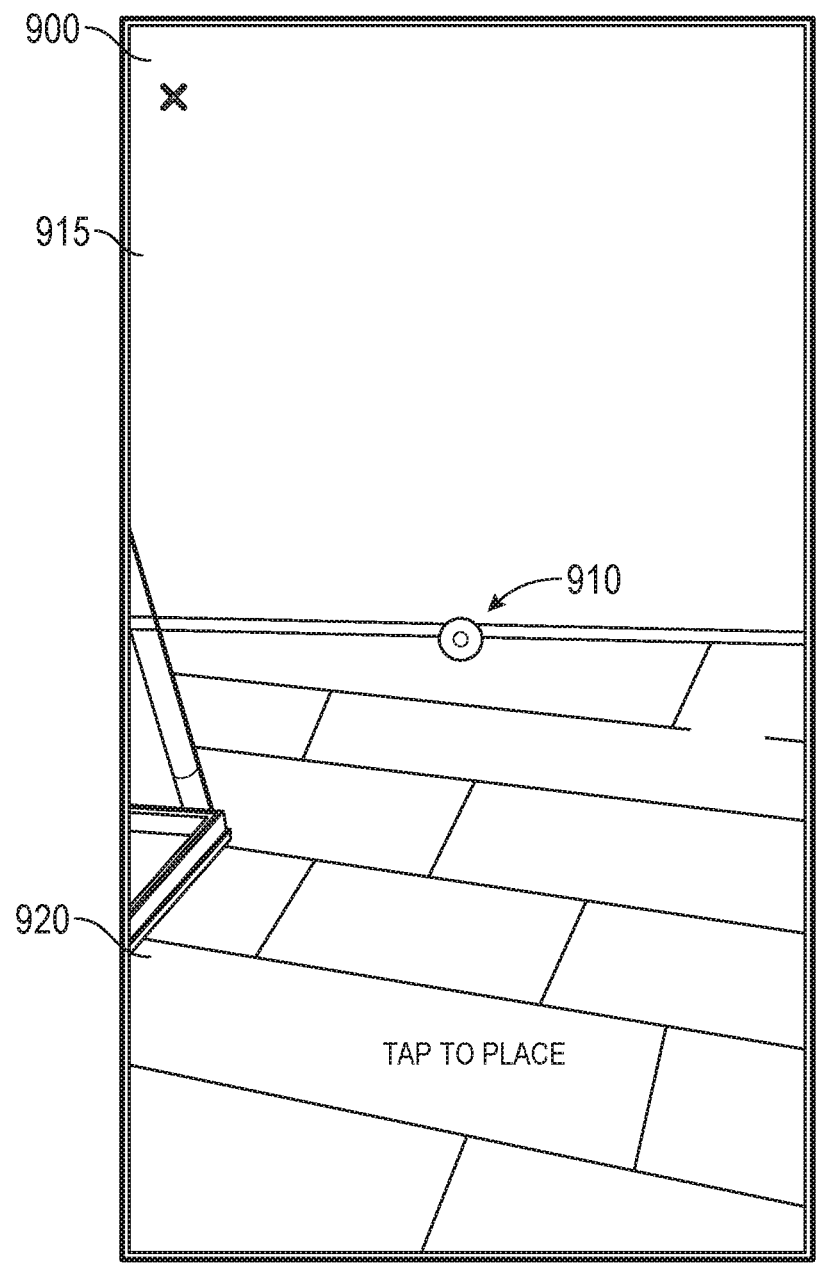
FIGS. 9A-11 show example user interfaces for edge placement, according to some example embodiments.
Figure 9B:
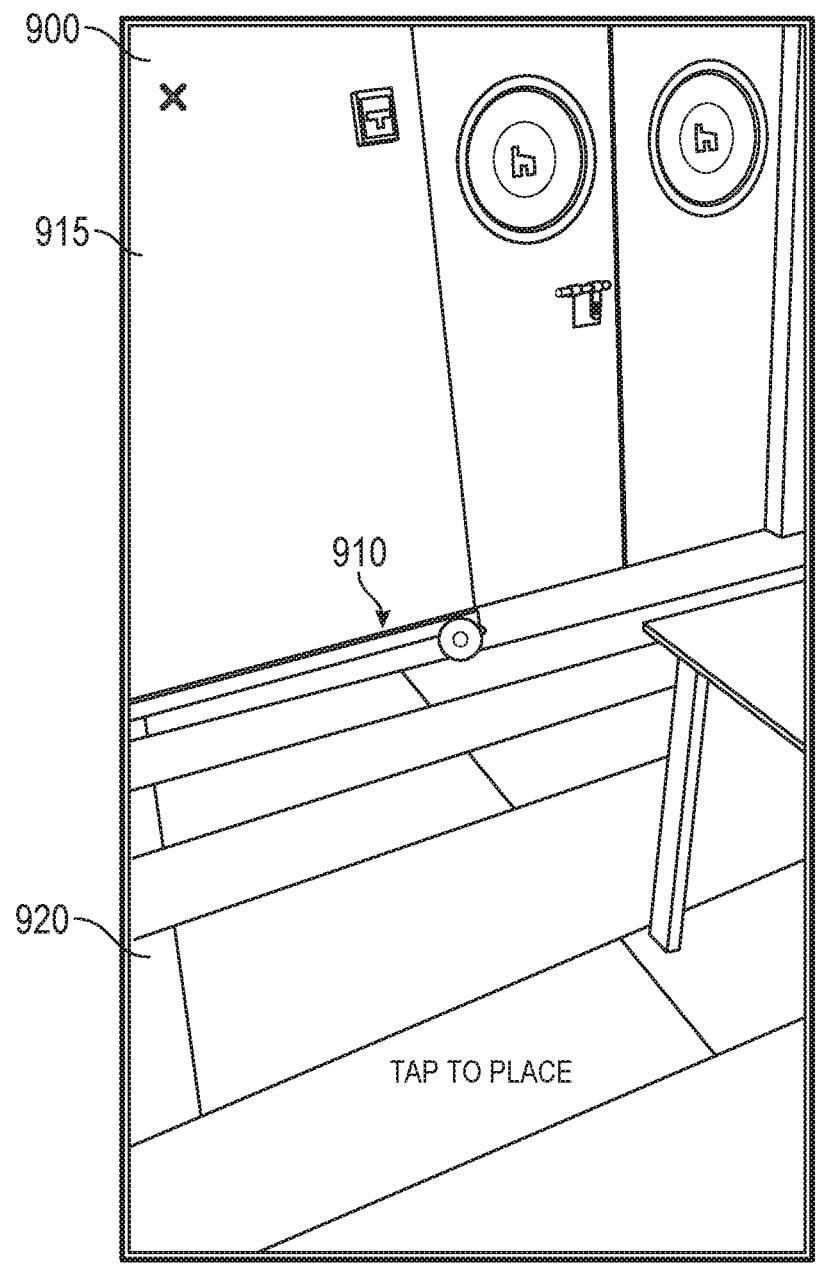
Figure 9C:
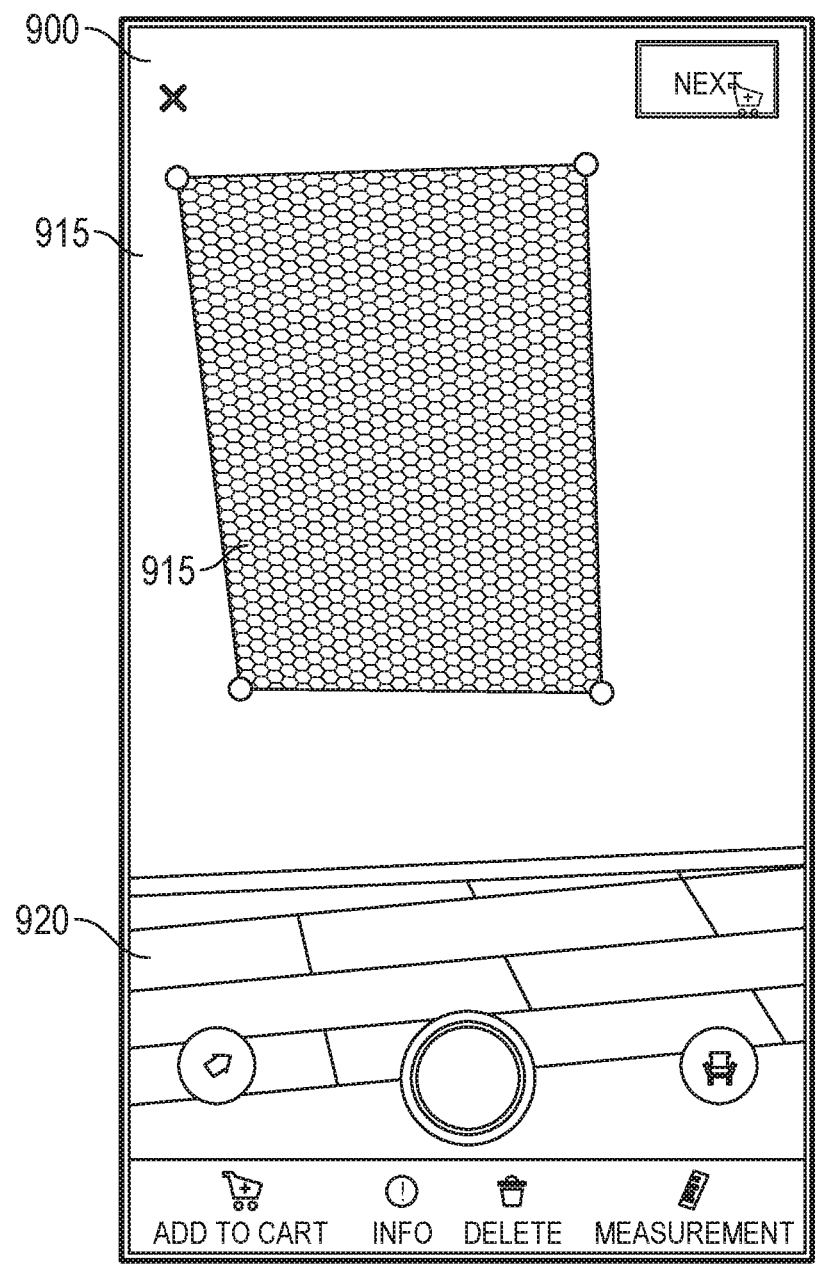
Figure 10:
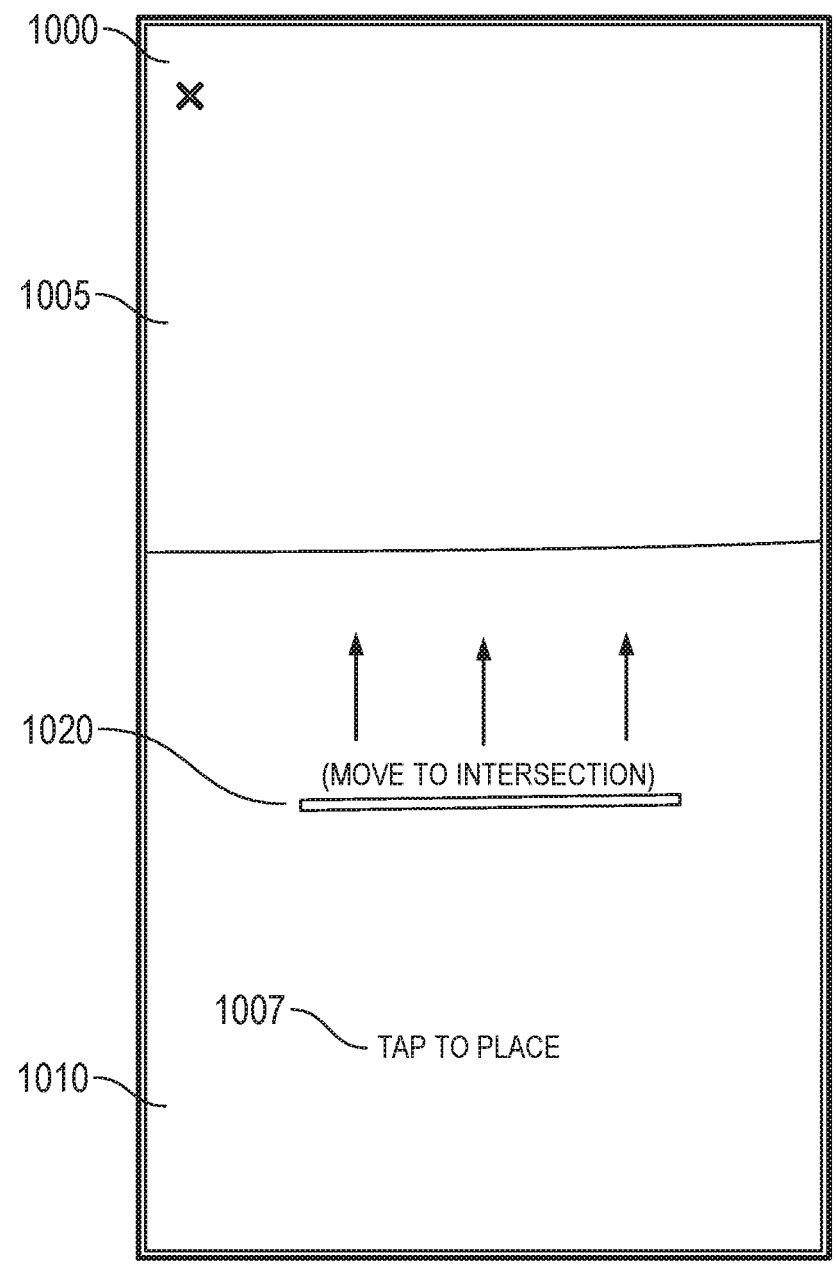
Figure 11:
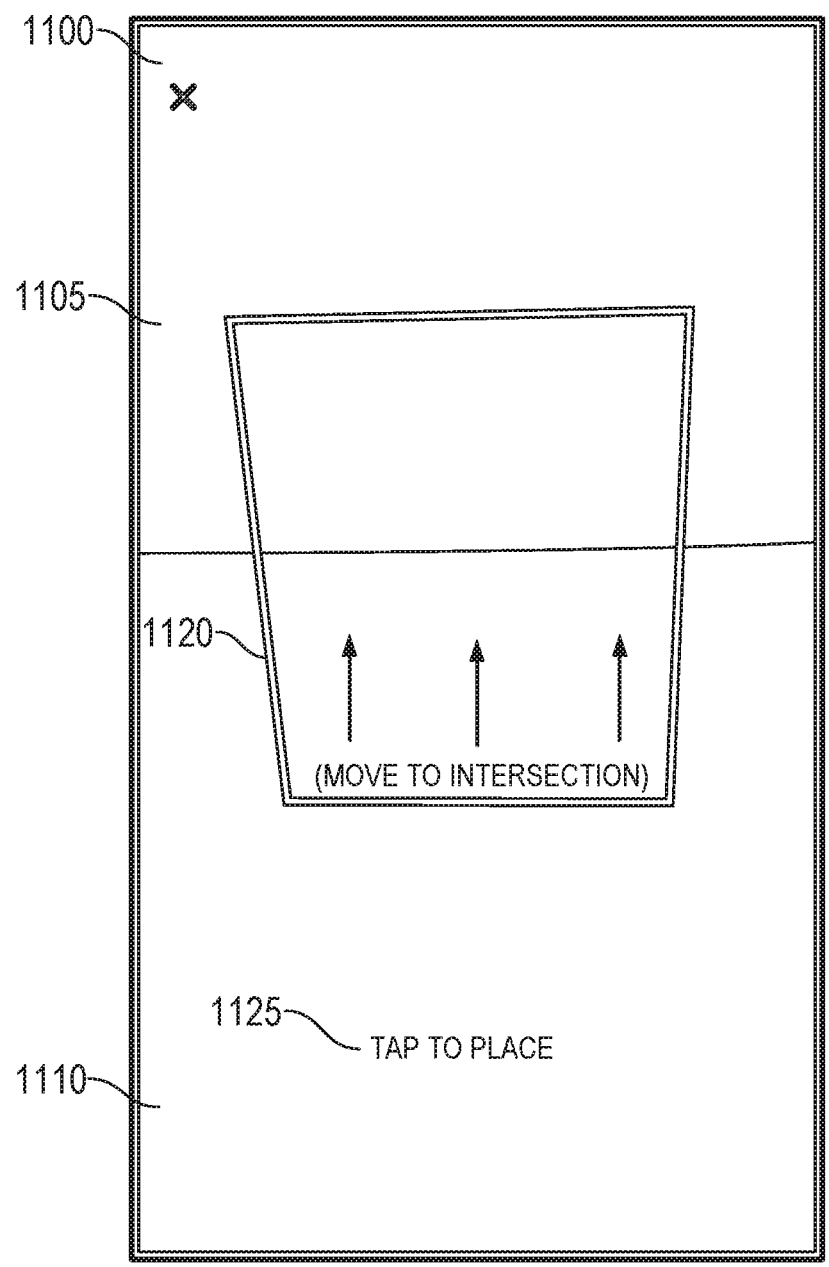

In operation 820, the surface engine 210 generates an edge from the first point in the second point along the virtual floor, and stores the edge to memory of the client device. The line connecting the first and second points on the horizontal virtual floor indicate where the vertical wall is to be generated as extending orthogonally from the virtual floor. After operation 820 the subroutine continues to operation 725 of method 700, in which the vertical wall is generated from the edge data, and the virtual item 925 is simulated on the wall, as illustrated in FIG. 9C.

FIG. 8B shows a flow diagram of a method 840 for receiving edge placement using lines, according to some example embodiments. At operation 845, the surface engine 210 prompts the user. For example, with reference to user interface 1000 of FIG. 10, a notification 1007 "Tap to Place" is displayed. The user can then move the client device such that the line 1020 is along the intersection of the real world wall 1005 and the real world floor 1010 displayed in the live video of user interface 1000.

At operation 850, the surface engine 210 stores line data from the user. For example, when the client device has moved such that the line 1020 is projected onto the horizontal virtual floor over the intersection, the user taps on the touchscreen to store the line (e.g., the projected position of the line on the virtual floor) for generation of the virtual wall. After operation 850, the method 840 returns to operation 725 of method 700, as discussed above.

FIG. 8C shows a flow diagram of a method 870 for receiving edge placement data using planes, according to some example embodiments. At operation 875, the surface engine 210 displays a prompt to the user. For example, with reference to user interface 1100 in FIG. 11, a notification 1125 including the text "Tap to Place" is displayed. The user can then move the client device such that the bottom side of the plane 1120 is along the intersection of the real world wall 1105 and the real world floor 1110 as displayed in the live video in user interface 1100.

At operation 880, the surface engine 210 stores the plane data. For example, when the client device has been moved (e.g., by the user) such that the bottom side of the plane 1120 is projected on the horizontal virtual floor over the intersection of the real world wall 1105 and real world floor 1110, the user taps on the touchscreen to store the plane data (e.g., store the projected position of the plane 1120 on the horizontal virtual floor). The example plane embodiment can be advantageous in that it may better convey to the user that a virtual plane that will correspond to the real world wall 1105 is being placed for simulation of the virtual items. After operation 850, method 870 continues to operation 725 of method 700, as discussed above.

Figure 12:
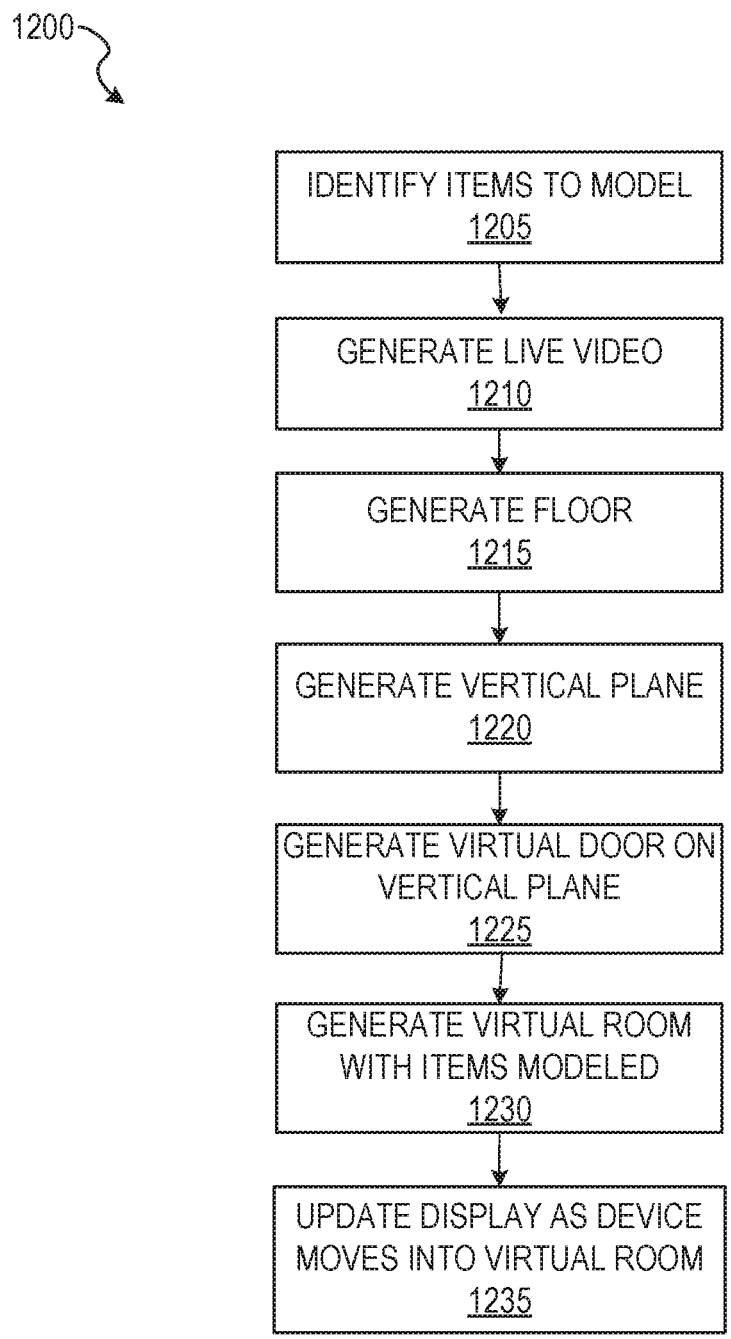
FIG. 12 shows a flow diagram of a method for generating a virtual door with a corresponding virtual room using vertical plane detection and generation methods, according to some example embodiments.
Figure 13:
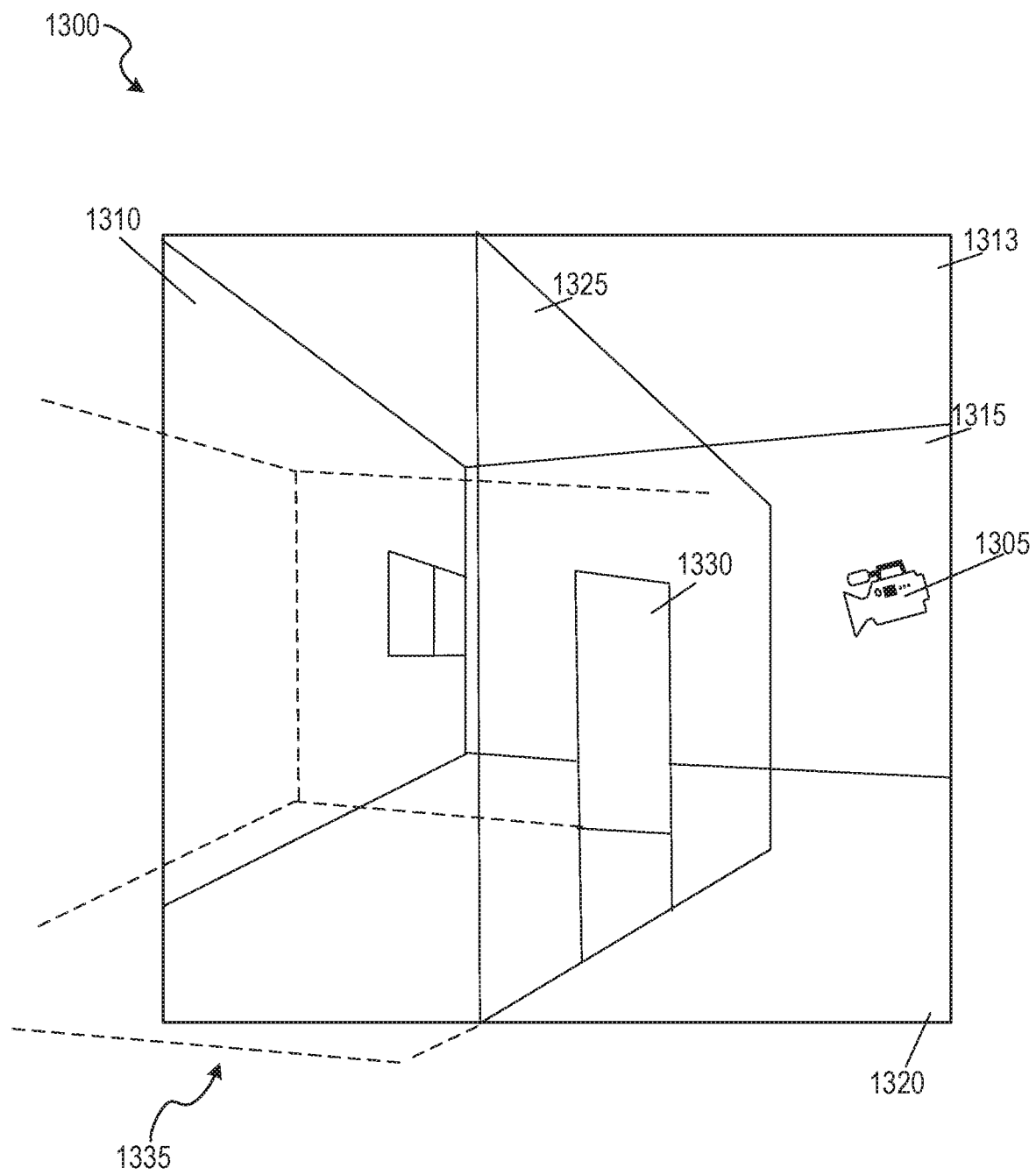
FIG. 13 shows an example real-world room and virtual room, according to some example embodiments.

FIG. 12 shows a method 1200 for generating a virtual door with a corresponding virtual room using vertical plane detection and generation methods, according to some example embodiments. The planar placement system 150 can implement the vertical wall approaches to generate entire virtual rooms that can be viewed through the live video of the client device to provide a realistic augmented reality for the user. For example, with reference to FIG. 13, the view 1300 depicts a device 1305 which can be a client device (e.g., client device 110) and a virtual camera managed by the modeling engine 215, where the virtual camera position is continuously updated by tracking features of the environment as discussed in FIG. 5 above. The environment in FIG. 13 is a room including wall 1310, ceiling 1313, wall 1315, and floor 1320. The device 1305 generates a virtual floor that is aligned with the floor 1320, and then can generate a virtual vertical plane 1325 using the above approaches (e.g., FIGS. 8A-8C), on which a virtual door 1330 is rendered. The virtual door 1330 operates as a portal to a virtual room 1335 that is rendered by the modeling engine 215 using the above approaches. For example, as the device 1305 moves through the virtual door (e.g., the real world space at which the door is rendered and pinned in the live video), the modeling engine 215 tracks the features and inertial data and generates the room 1335 render data for an immersive augmented reality experience. The room 1335 can include example 3D model data of virtual items, such as a virtual chair, a virtual lamp, a virtual couch, as arranged by an interior designer user. For instance, the room 1335 can be a virtual showroom where the items are selected and placed by the interior designer user, and the data of the room 1335 is sent to a customer end-user (e.g., a customer of the interior designer) to place the virtual door 1330 where ever the customer end-user is located, and view the interior designers room 1335 in an immersive way, where the vertical planes are accurately rendered and aligned using the above approaches.

Figure 14A:
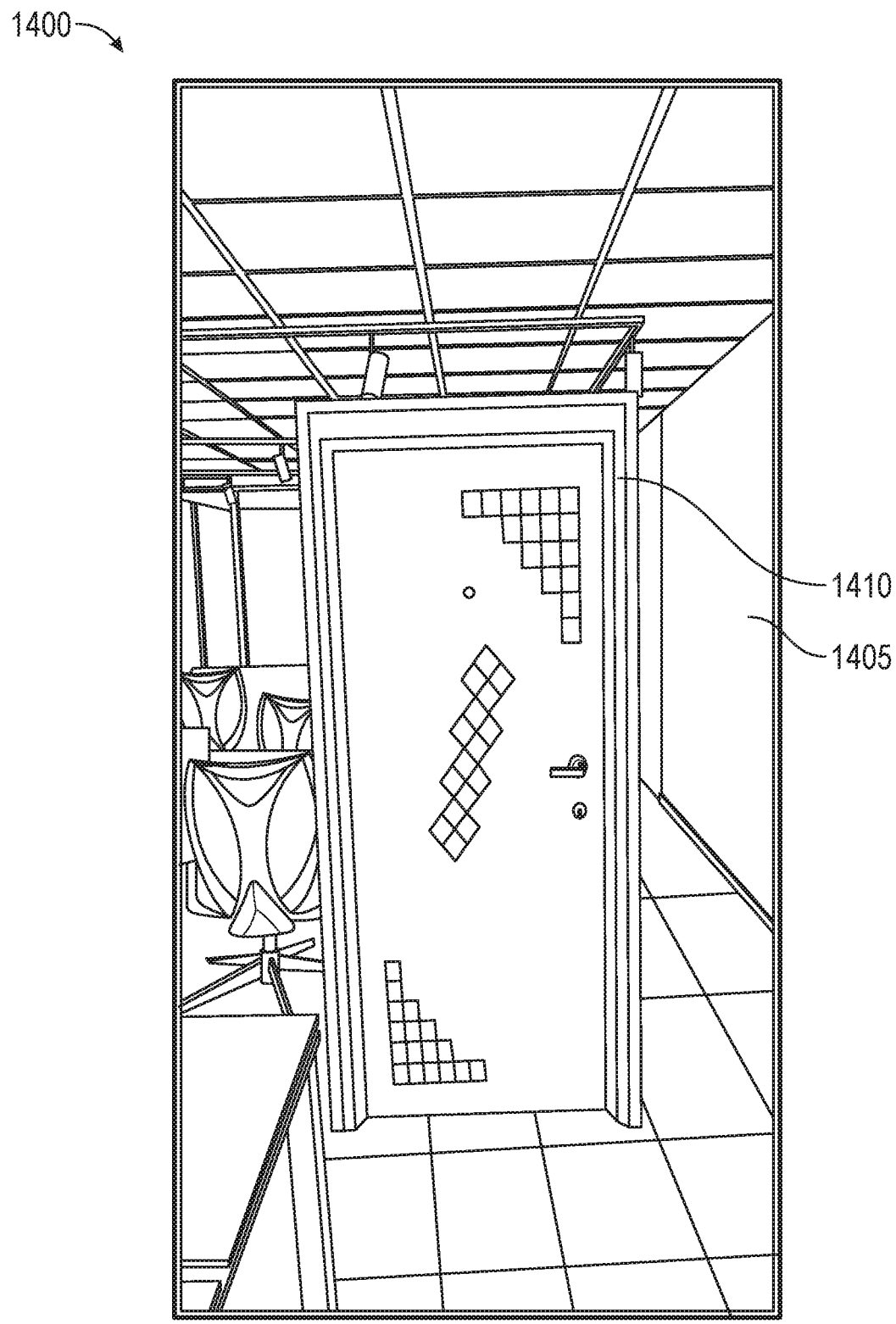
FIGS. 14A-14C show example user interfaces for virtual room simulations, according to some example embodiments.
Figure 14B:
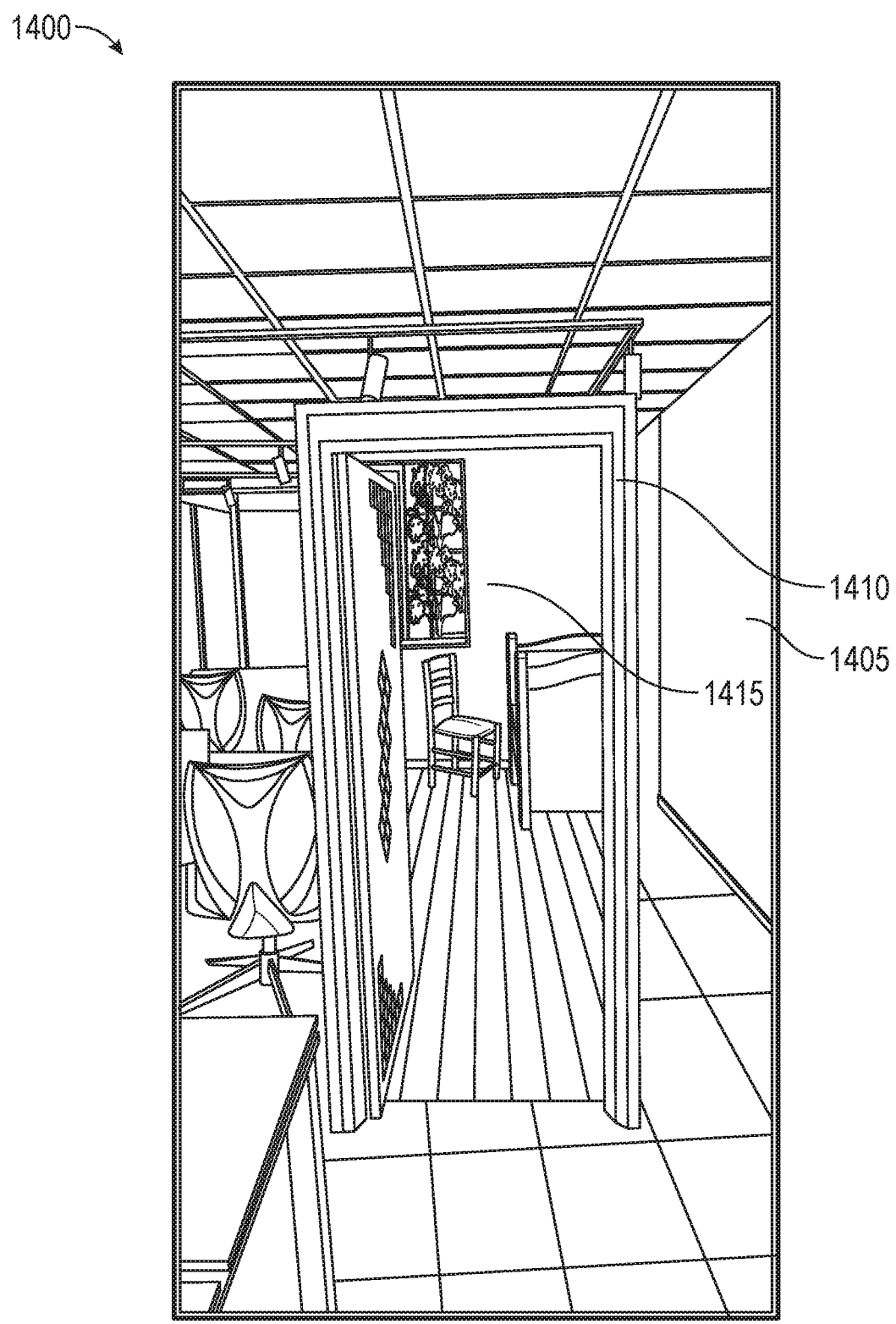
Figure 14C:
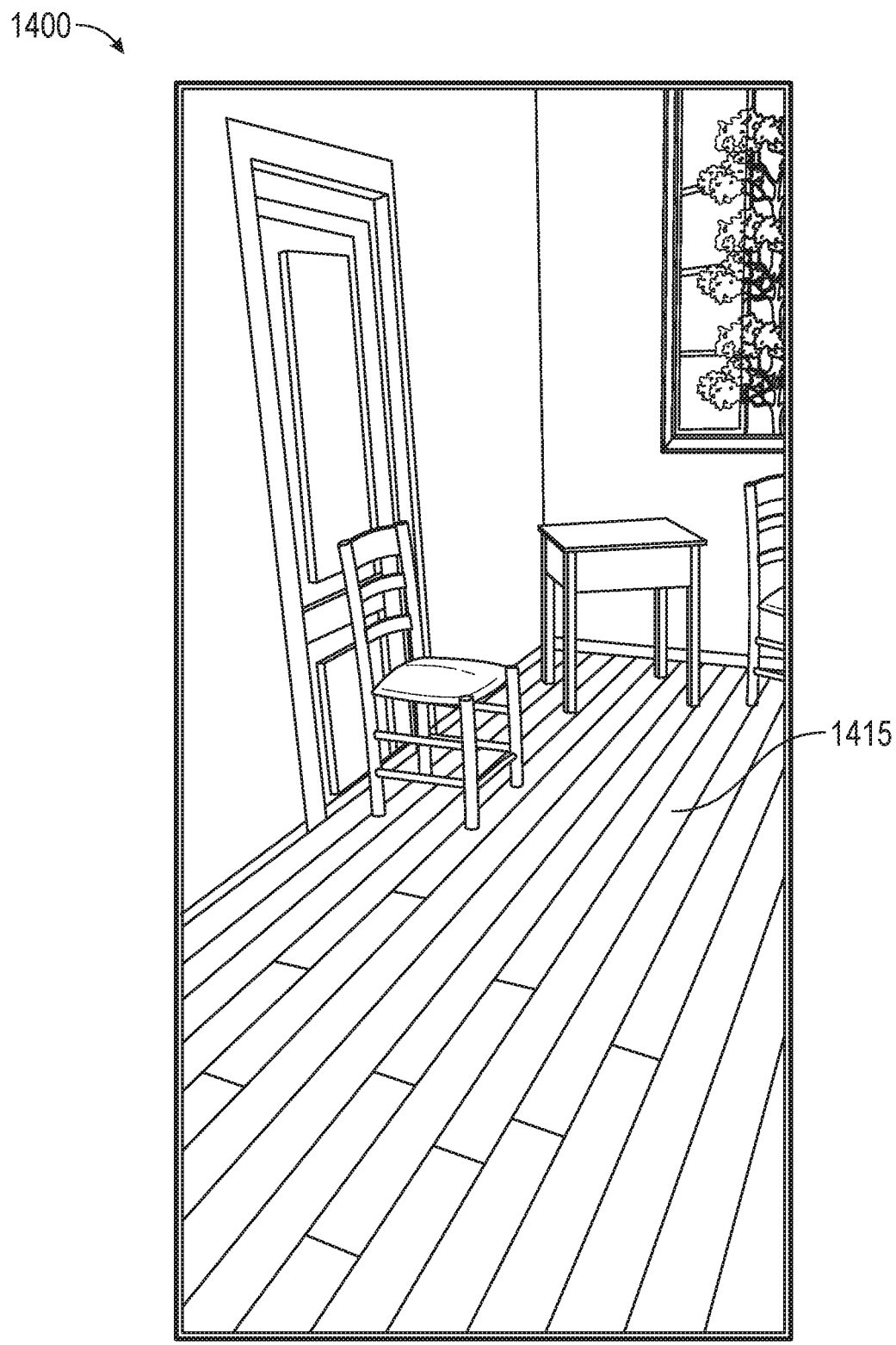

FIG. 14A-14C show example user interfaces of the virtual room, according to some example embodiments. In FIG. 14A shows a user interface 1400 which is a live video of a room 1405 in which a virtual door 1410 is generated. Using the above approaches, the system 150 is able to accurately render the door as anchored to the real world ground of the room 1405 and accurately perpendicular to the real world floor and not, for example floating in the air due to inaccurate feature tracking, as in other convention approaches. FIG. 14B illustrates the door 1410 opening as the client device nears the door 1410. As illustrated, through the door 1410 a virtual bedroom 1415 is rendered and displayed, where the virtual bedroom 1415 has virtual items (e.g., a chair, a bed) that function as a virtual showroom. Further, as the client device moves in the space in which the virtual bedroom 1415 is anchored, the modeling engine 215 continuously updates the virtual camera position so that the user can "walk" around the virtual showroom.

Returning to FIG. 12, at operation 1205, the interface engine 200 identifies items to model. For example, a user selects a chair to model in a virtual room. At operation 1210, the capture engine 205 generates live video, which is displayed on the display screen in real-time or near real-time. At operation 1215, the surface engine 210 generates a virtual floor that is aligned with a detected physical floor, as discussed above. At operation 1220, the surface engine 210 generates a virtual wall using an edge placement, as discussed above. At operation 1225, the modeling engine 215 generates a virtual door on the generated virtual plane as shown in FIG. 14A.

At operation 1230, modeling engine 215 generates a virtual room with rendered items for display, as shown in FIG. 14B. At operation 1235, the modeling engine 215 updates the display of the virtual room and the items as the device moves into and around the virtual room, as shown in FIG. 14C.

FIGS. 15-21 show example source code flow diagrams of structure source code included below, according to some example embodiments. The structure source code is an example implementation of the methods discussed above. Comment code is indicated by the use of two forward slashes. Some of the comments indicate which figure corresponds to the code below the comment. One of ordinary skill in the art appreciates that, although the structure source code may resemble a certain programming language, other programming languages can implement the structure source code below.

Figure 15:
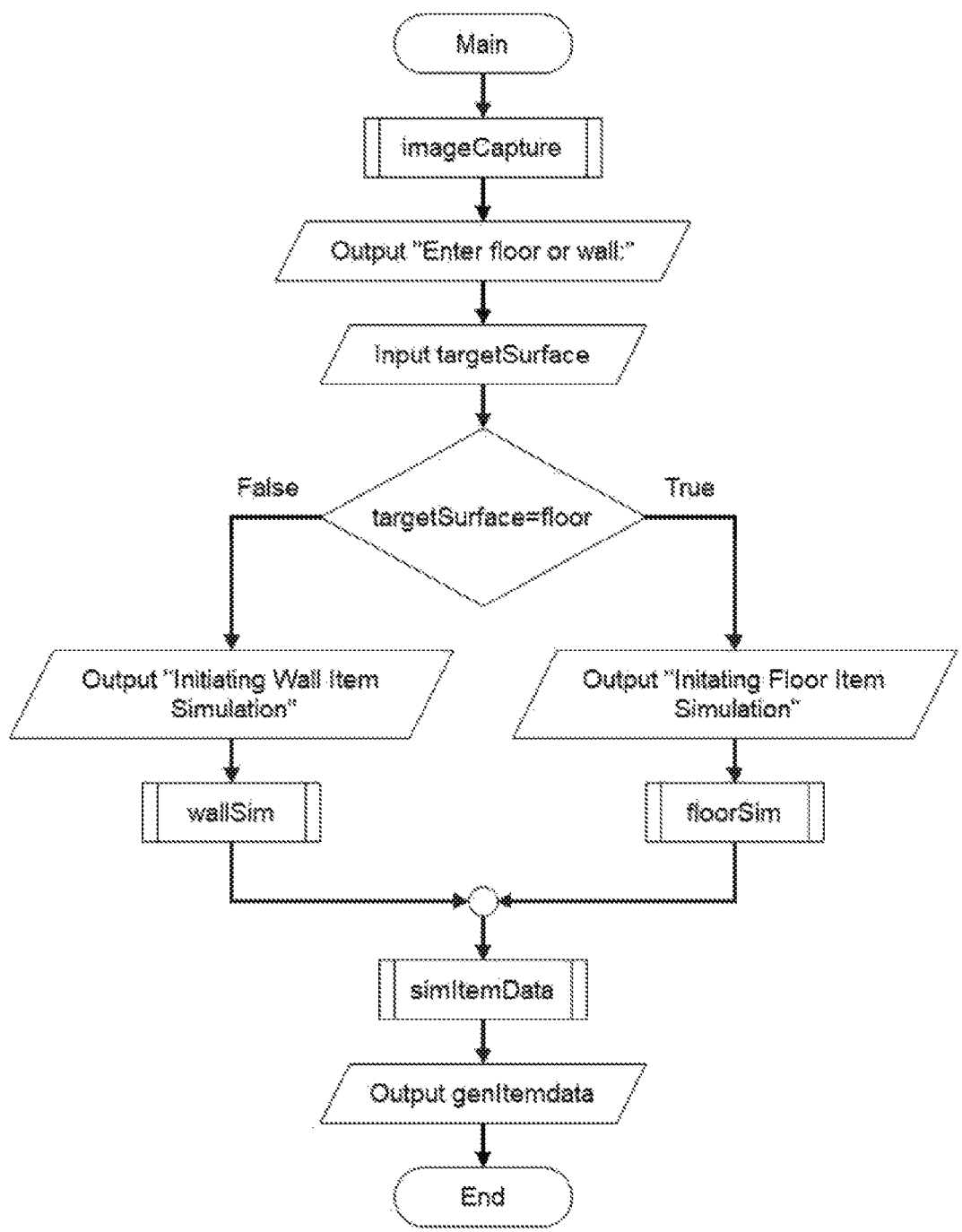
FIG. 15-21 show example structural source code diagrams, according to some example embodiments.
Figure 16:
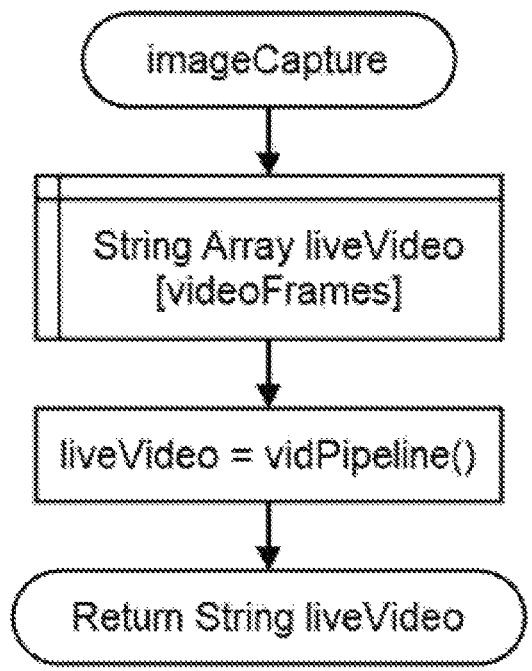
Figure 17:
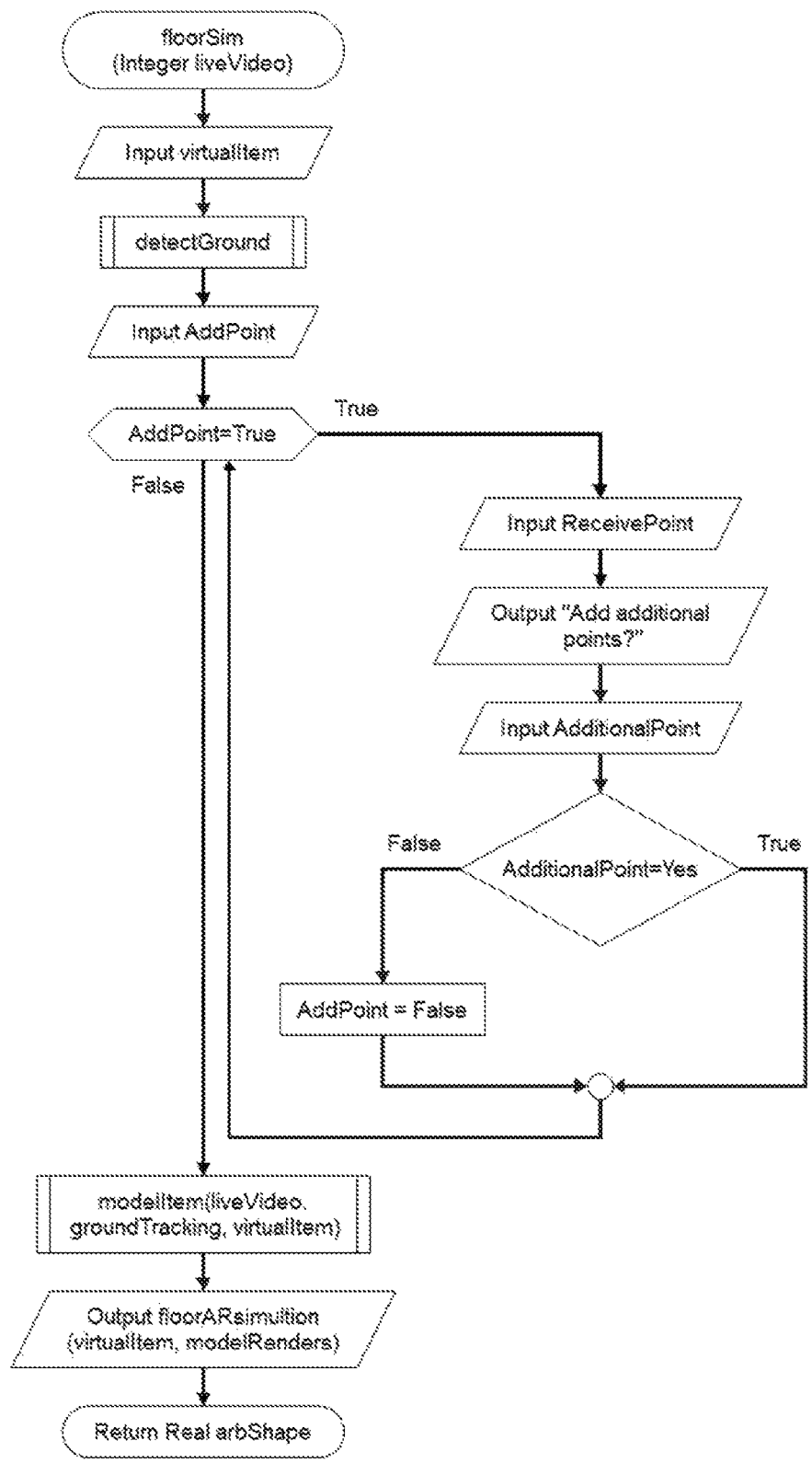
Figure 19:
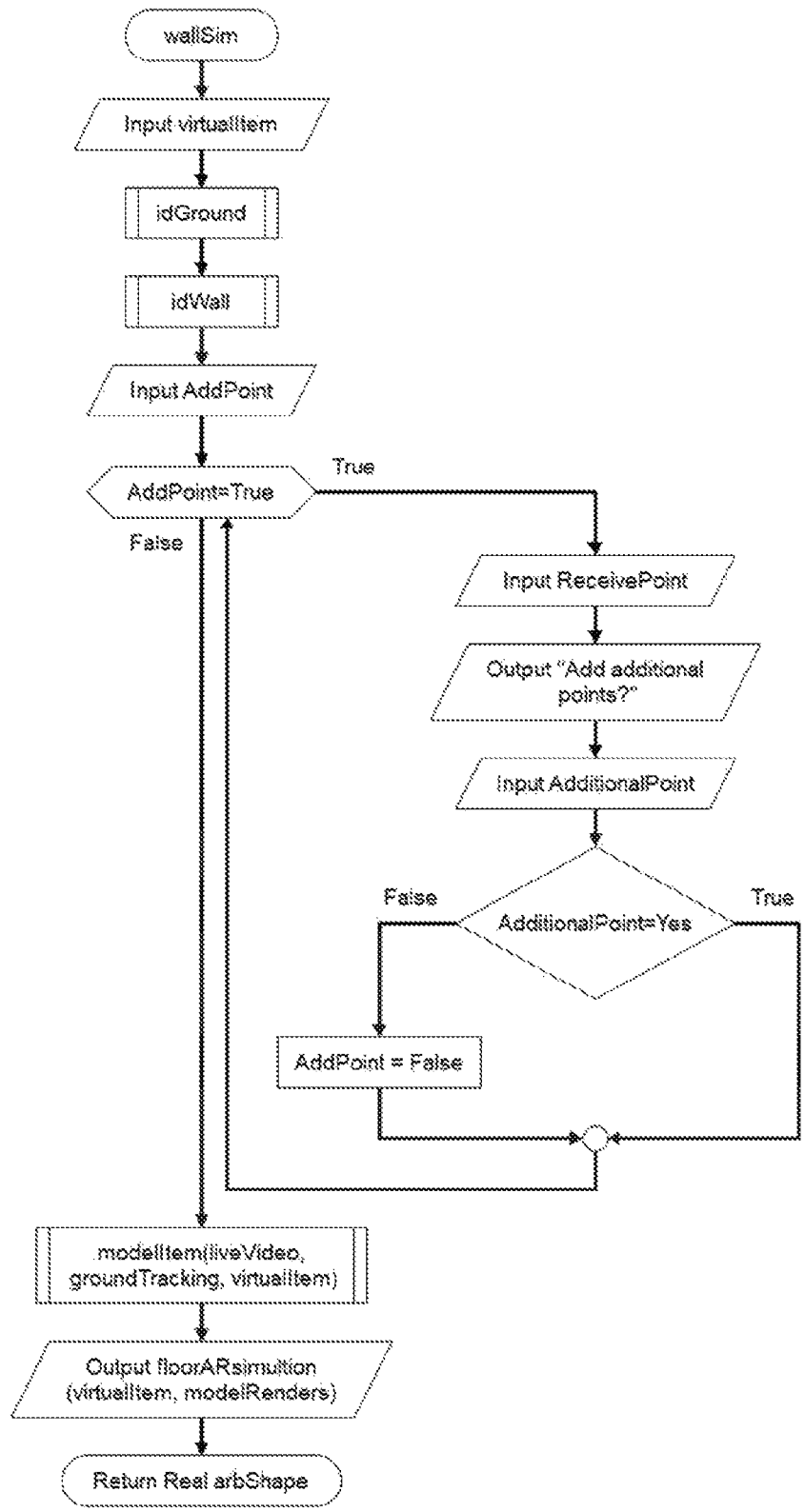

```
::::::CODE BEGIN::::::
#include <iostream>
#include <sstream>
#include <string>
#include <cstdlib>
#include <cmath>
using namespace std;
//FIG. 15
int main( ) {
   string targetSurface;
   //FIG. 16
   imageCapture( );
   cout << "Enter floor or wall:" << endl;
   cin >> targetSurface;
   if (targetSurface == floor) {
      cout << "Initiating Floor Item Simulation" << endl;
      //FIG. 17
      floorSim( );
   } else {
      cout << "Initiating Wall Item Simulation" << endl;
      //FIG. 19
      wallSim( );
   }
   // simItemData generates the simulation data for the simulated item,
such as the area simulated, the price per unit/roll/etc. for the selected
item, and boxes needed
   //
   simItemData( arbShape, virtualItem );
       //generate unit value per price, size, of virtual item units for
enclosed area.
   cout << genItemdata << endl;
   return 0;
}
double floorSim(int live Video) {
   double arbShape;
   string virtualItem;
   // virtual item to be modeled on floor, e.g., virtual chair, virtual
carpet/tiles, etc., is selected via input/output device, such as a keyboard,
mouse, or touchscreen selection.
   cin >> virtualItem;
   // detectGround detects the ground via image analysis, e.g., co-planar
image feature identification.
   detectGround( );
   // AddPoint enables a user to specify a first point, which acts as a
vertex of an arbitrary shape in which a virtual item is to be modeled,
e.g., add three points to form a triangle patch on the floor, and model
virtual kitchen tiles within the triangle patch on the live video.
   cin >> AddPoint;
   while (AddPoint == true) {
      cin >> ReceivePoint;
      cout << "Add additional points?" << endl;
      cin >> AdditionalPoint;
      if (AdditionalPoint ==Yes) {
      } else {
         AddPoint = false;
```

Figure 18:
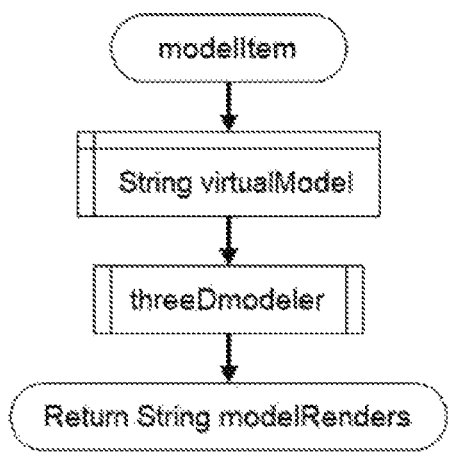
Figure 20A:
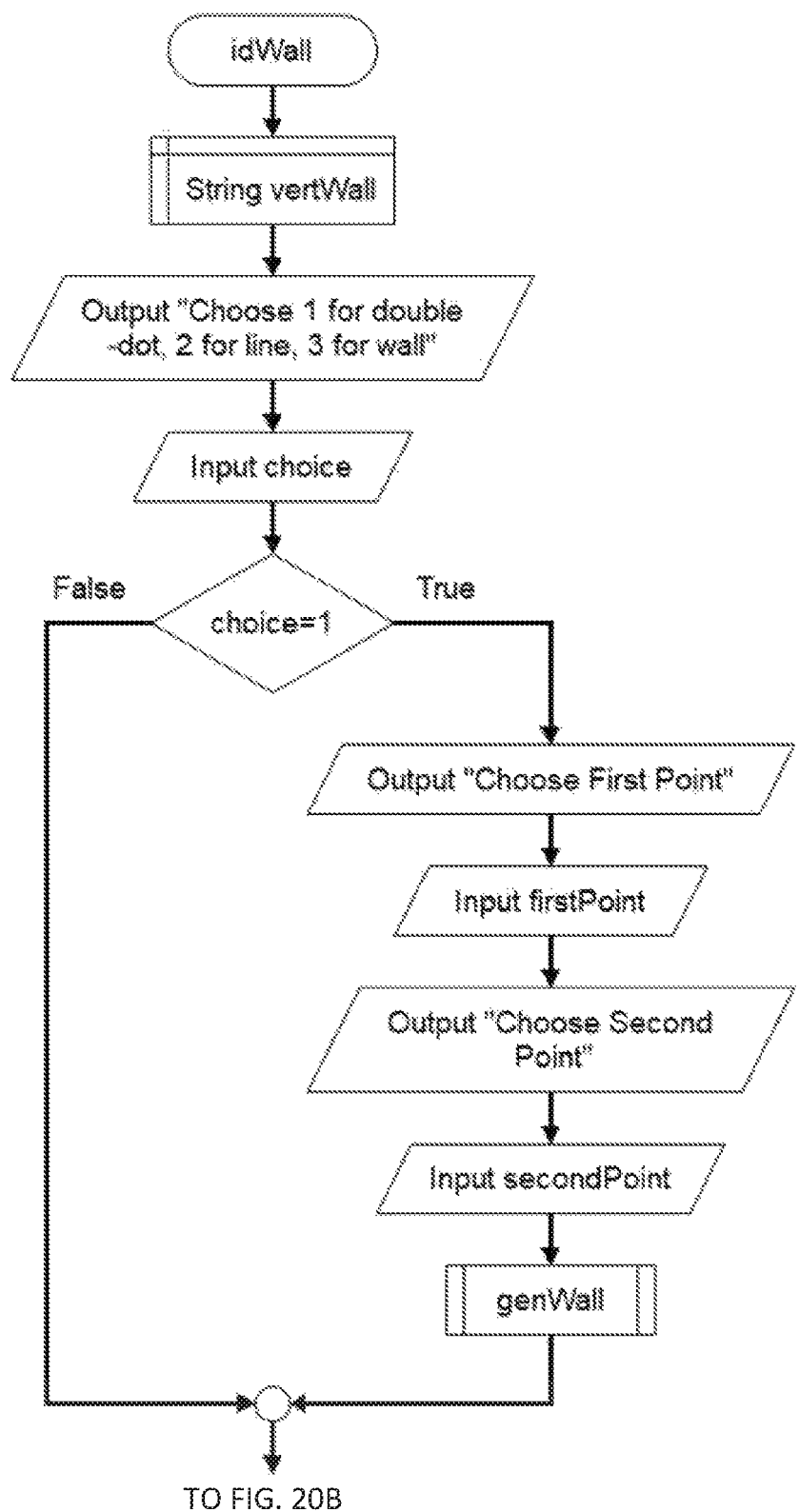
Figure 20B:
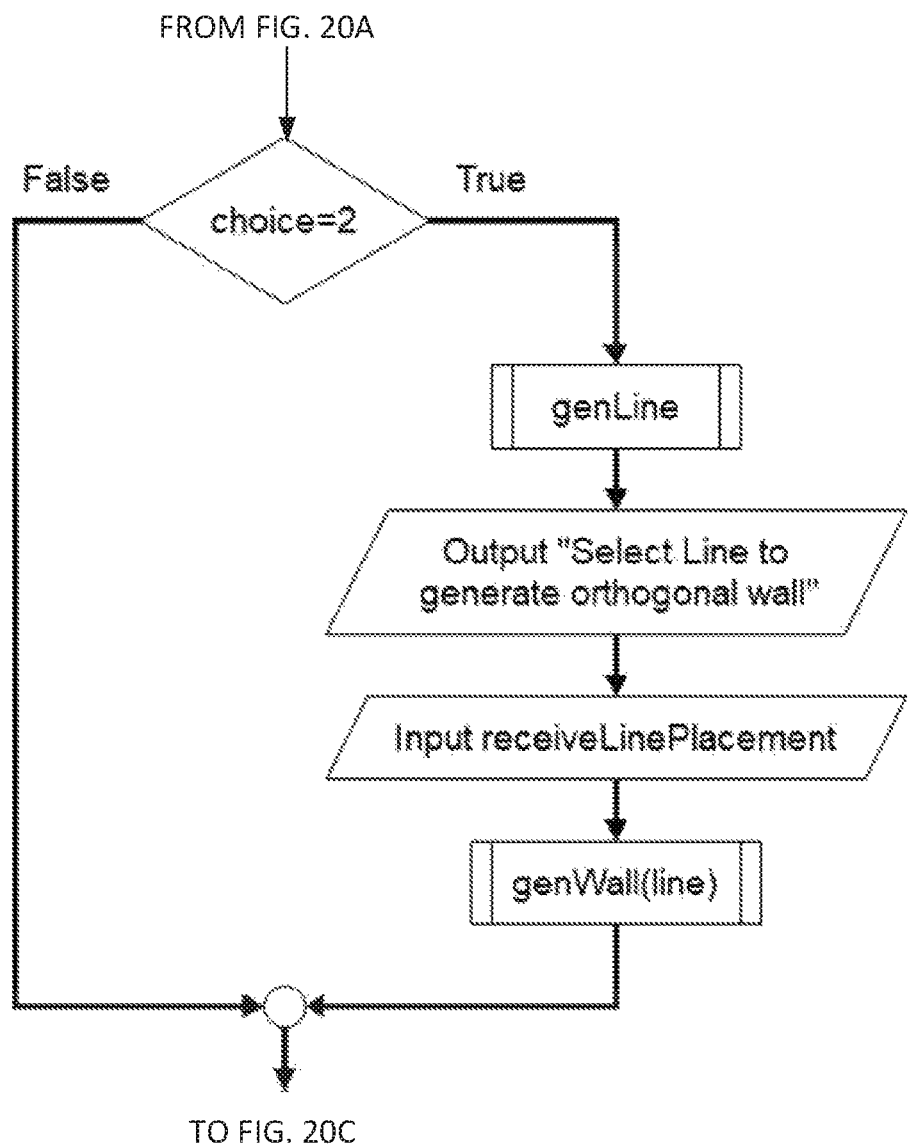
Figure 20C:
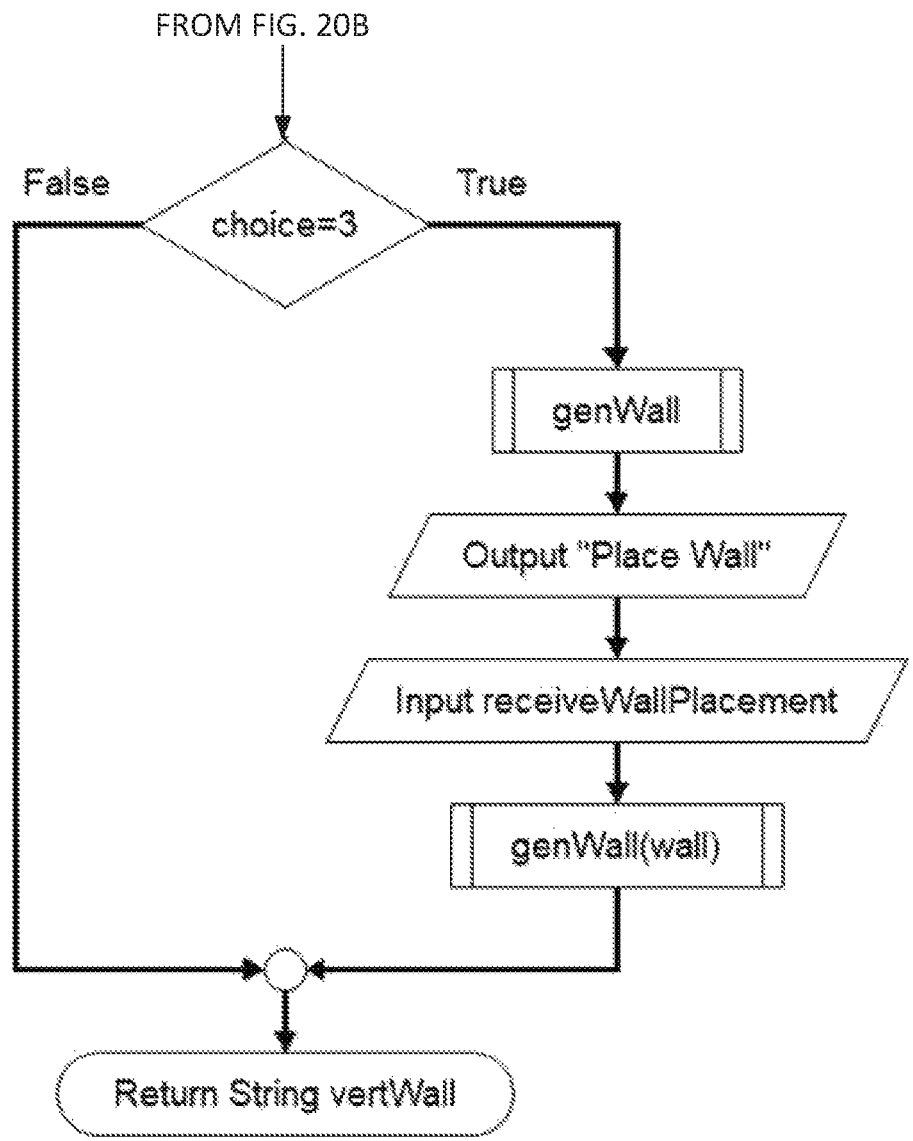
Figure 21:
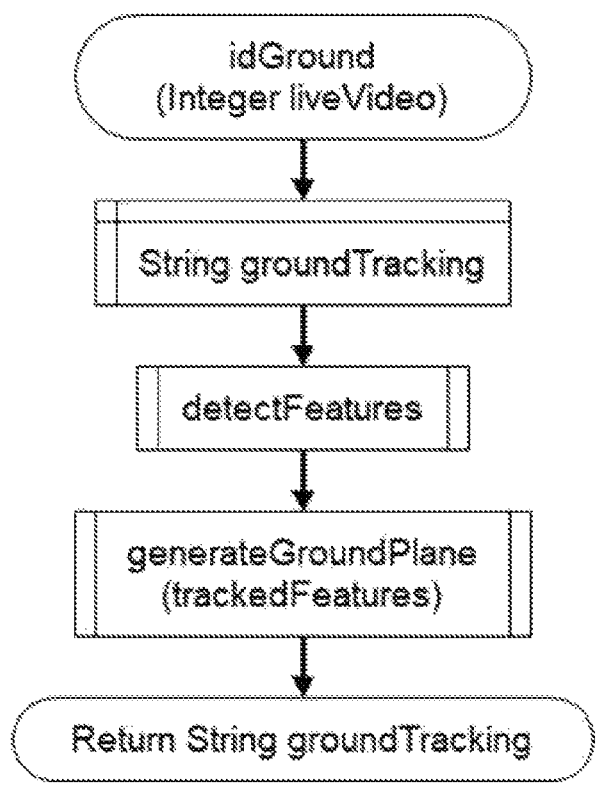

```
    }
  }
  // FIG. 18
  // modelItem receives the live video, tracking data, and the virtual
  item and models the item on the floor, e.g., within the arbitrary shape on
  the floor.
    modelItem(liveVideo, groundTracking, virtualItem);
    cout << floorARsimultion(virtualItem, modelRenders) << endl;
    return arbShape;
  }
  //FIG. 21, performs ground tracking for repositioning of virtual camera
  idGround(int live Video) {
    string groundTracking;
    detectFeatures( );
    generateGroundPlane(trackedFeatures);
    return groundTracking;
  }
  //FIG. 20A
  idWall( ) {
    vertWall;
    cout << "Choose 1 for double-dot, 2 for line, 3 for wall" << endl;
    cin >> choice;
    if (choice == 1) {
      cout << "Choose First Point" << endl;
      cin >> firstPoint;
      cout << "Choose Second Point" << endl;
      cin >> secondPoint;
      genWall( );
    }
    //FIG. 20B
    if (choice == 2) {
      genLine( );
      cout << "Select Line to generate orthogonal wall" << endl;
      cin >> receiveLinePlacement;
      genWall(line);
    }
    FIG. 20C
    if (choice == 3) {
      genWall( );
      cout << "Place Wall" << endl;
      cin >> receiveWallPlacement;
      genWall(wall);
    }
    return vertWall;
  }
  string imageCapture( ) {
    string live.Video[videoFrames];
    // Image capture pipeline to generate images or live video that is
    captured by a client device camera and is displayable in real-time or
    near real-time (e.g.; after further image effects, or virtual item render
    overlays) .
    live Video = vidPipeline( );
    return live Video;
  }
  string modelItem( ) {
    string virtualModel;
    threeDmodeler( );
    return modelRenders;
  }
  void simItemData(int arbShape, int virtualItem) {
  }
  double wallSim( ) {
    double arbShape;
    double arbShape;
    string virtualItem;
    cin >> virtualItem;
    idGround( );
    id Wall( );
    cin >> AddPoint;
    while (AddPoint == true) {
      cin >> ReceivePoint;
      cout << "Add additional points?" << endl;
      cin >> AdditionalPoint;
      if (AdditionalPoint == Yes) {
      } else {
        AddPoint = false;
      }
    }
  }
  // FIG. 18
    modelItem(liveVideo, groundTracking, virtualItem);
    cout << floorARsimultion virtualItem; modelRenders << endl;
    return arbShape;
  }
  // The following implements type conversion functions.
  string toString (double value) {///int also
    stringstream temp;
    temp << value;
    return temp.str( );
  }
  int toInt (string text) {
    return atoi(text.c_str( ));
  }
  double toDouble (string text) {
    return atof(text.c_str( ));
  }
      :::::::CODE END::::::::
```

Figure 22:
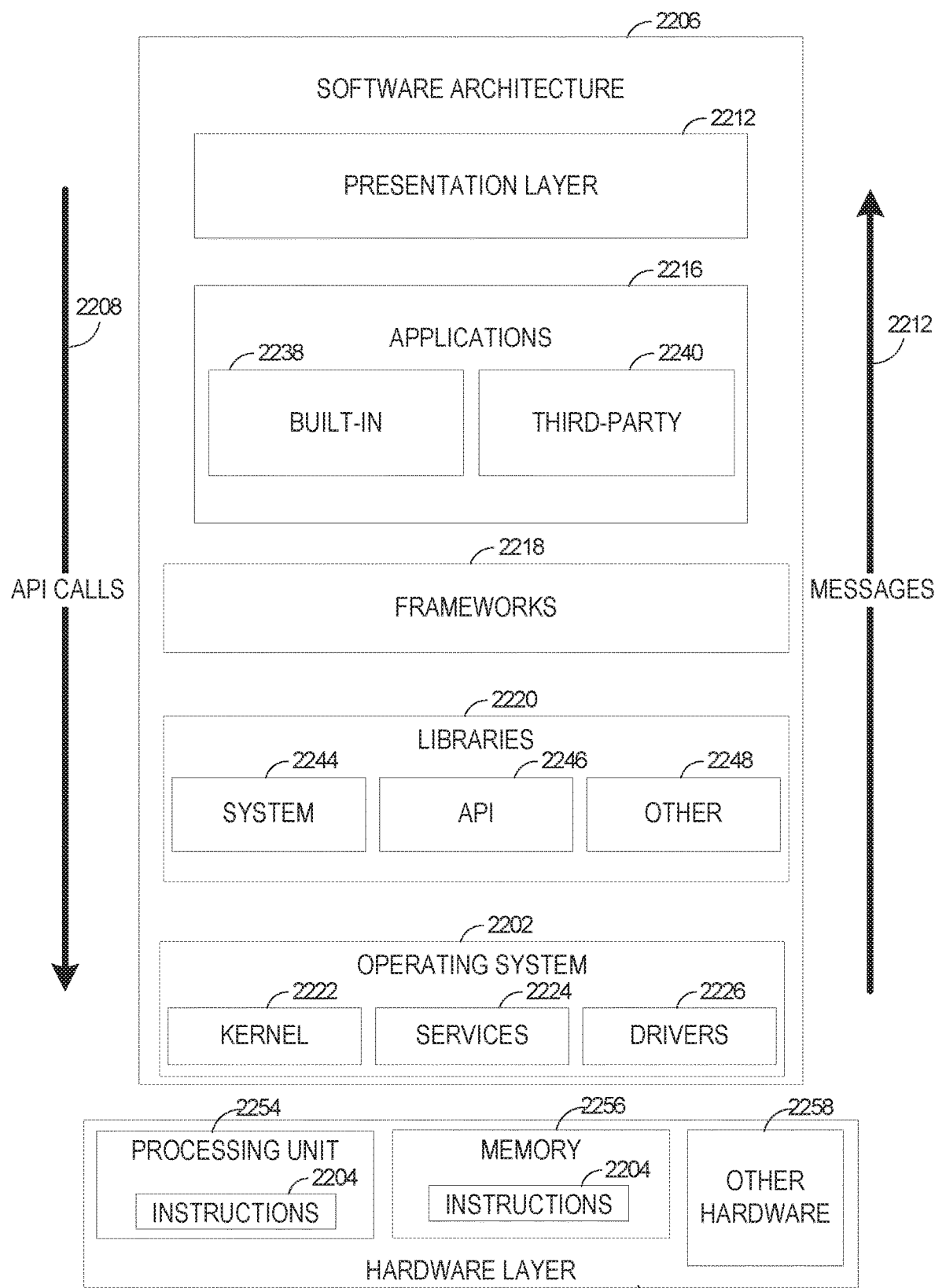
FIG. 22 is a block diagram illustrating a representative software architecture, which may be used in conjunction with various hardware architectures herein described.

FIG. 22 is a block diagram illustrating an example software architecture 2206, which may be used in conjunction with various hardware architectures herein described. FIG. 22 is a non-limiting example of a software architecture, and it will be appreciated that many other architectures may be implemented to facilitate the functionality described herein. The software architecture 2206 may execute on hardware that includes, among other things, processors, memory, and I/O components. A representative hardware layer 2252 is illustrated and can represent, for example, the machine 2300 of FIG. 23. The representative hardware layer 2252 includes a processing unit 2254 having associated executable instructions 2204. The executable instructions 2204 represent the executable instructions of the software architecture 2206, including implementation of the methods, components, and so forth described herein. The hardware layer 2252 also includes a memory/storage 2256, which also has the executable instructions 2204. The hardware layer 2252 may also comprise other hardware 2258.

In the example architecture of FIG. 22, the software architecture 2206 may be conceptualized as a stack of layers where each layer provides particular functionality. For example, the software architecture 2206 may include layers such as an operating system 2202, libraries 2220, frameworks/middleware 2218, applications 1216, and a presentation layer 2214. Operationally, the applications 1216 and/or other components within the layers may invoke API calls 2208 through the software stack and receive a response in the form of messages 2212. The layers illustrated are representative in nature and not all software architectures have all layers. For example, some mobile or special-purpose operating systems may not provide a frameworks/middleware 2218, while others may provide such a layer. Other software architectures may include additional or different layers.

The operating system 2202 may manage hardware resources and provide common services. The operating system 2202 may include, for example, a kernel 2222, services 2224, and drivers 2226. The kernel 2222 may act as an abstraction layer between the hardware and the other software layers. For example, the kernel 2222 may be responsible for memory management, processor management (e.g., scheduling), component management, networking, security settings, and so on. The services 2224 may provide other common services for the other software layers. The drivers 2226 are responsible for controlling or interfacing with the underlying hardware. For instance, the drivers 2226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2220 provide a common infrastructure that is used by the applications 1216 and/or other components and/or layers. The libraries 2220 provide functionality that allows other software components to perform tasks in an easier fashion than by interfacing directly with the underlying operating system 2202 functionality (e.g., kernel 2222, services 2224, and/or drivers 2226). The libraries 2220 may include system libraries 2244 (e.g., C standard library) that may provide functions such as memory allocation functions, string manipulation functions, mathematical functions, and the like. In addition, the libraries 2220 may include API libraries 2246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2220 may also include a wide variety of other libraries 2248 to provide many other APIs to the applications 1216 and other software components/modules.

The frameworks/middleware 2218 provide a higher-level common infrastructure that may be used by the applications 2216 and/or other software components/modules. For example, the frameworks/middleware 2218 may provide various graphic user interface (GUI) functions, high-level resource management, high-level location services, and so forth. The frameworks/middleware 2218 may provide a broad spectrum of other APIs that may be utilized by the applications 2216 and/or other software components/modules, some of which may be specific to a particular operating system 2202 or platform.

The applications 2216 include built-in applications 2238 and/or third-party applications 2240. Examples of representative built-in applications 2238 may include, but are not limited to, a contacts application, a browser application, a book reader application, a location application, a media application, a messaging application, and/or a game application. The third-party applications 2240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2240 may invoke the API calls 2208 provided by the mobile operating system (such as the operating system 2202) to facilitate functionality described herein.

The applications 1216 may use built-in operating system functions (e.g., kernel 2222, services 2224, and/or drivers 2226), libraries 2220, and frameworks/middleware 2218 to create user interfaces to interact with users of the system. Alternatively, or additionally, in some systems, interactions with a user may occur through a presentation layer, such as the presentation layer 2214. In these systems, the application/component "logic" can be separated from the aspects of the application/component that interact with a user.

Figure 23:
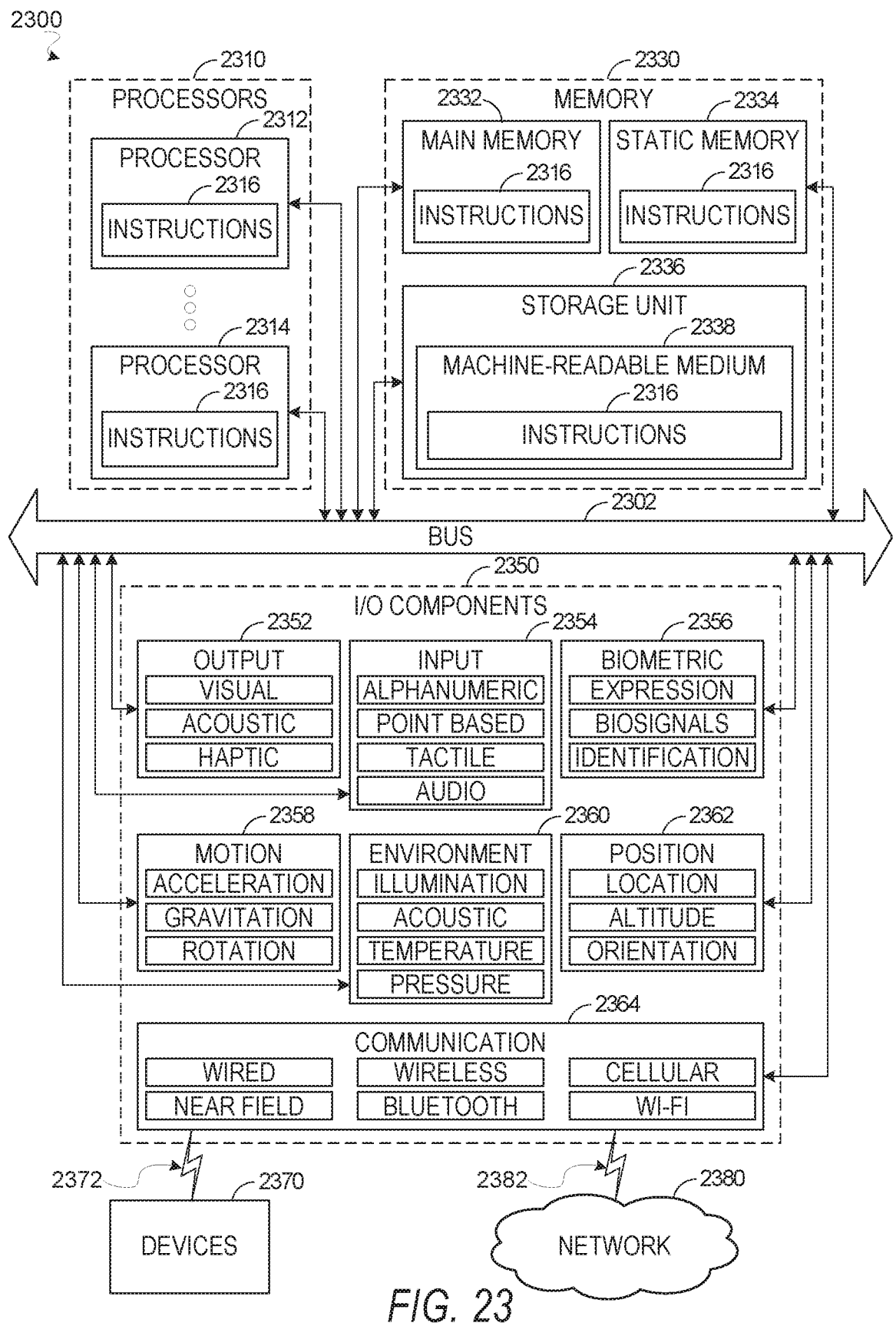
FIG. 23 is a block diagram illustrating components of a machine, according to some example embodiments, able to read instructions from a machine-readable medium (e.g., a machine-readable storage medium) and perform any one or more of the methodologies discussed herein.

FIG. 23 is a block diagram illustrating components of a machine 2300, according to some example embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein may be executed. As such, the instructions 1456 may be used to implement modules or components described herein. The instructions 2316 transform the general, non-programmed machine 2300 into a particular machine 2300 programmed to carry out the described and illustrated functions in the manner described. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by the machine 2300. Further, while only a single machine 2300 is illustrated, the term "machine" shall also be taken to include a collection of machines that individually or jointly execute the instructions 2316 to perform any one or more of the methodologies discussed herein.

The machine 2300 may include processors 2310, memory/storage 2330, and I/O components 2350, which may be configured to communicate with each other such as via a bus 2302. The memory/storage 2330 may include a main memory 2332, static memory 2334, and a storage unit 2336, both accessible to the processors 2310 such as via the bus 2302. The storage unit 2336 and memory 2332 store the instructions 2316 embodying any one or more of the methodologies or functions described herein. The instructions 2316 may also reside, completely or partially, within the memory 2332, within the storage unit 1436 (e.g., on machine readable-medium 2338), within at least one of the processors 2310 (e.g., within the processor cache memory accessible to processors 2312 or 2314), or any suitable combination thereof, during execution thereof by the machine 2300. Accordingly, the memory 2332, the storage unit 2336, and the memory of the processors 2310 are examples of machine-readable media.

The I/O components 2350 may include a wide variety of components to receive input, provide output, produce output, transmit information, exchange information, capture measurements, and so on. The specific I/O components 2350 that are included in a particular machine 2300 will depend on the type of machine. For example, portable machines such as mobile phones will likely include a touch input device or other such input mechanisms, while a headless server machine will likely not include such a touch input device. It will be appreciated that the I/O components 2350 may include many other components that are not shown in FIG. 23. The I/O components 2350 are grouped according to functionality merely for simplifying the following discussion and the grouping is in no way limiting. In various example embodiments, the I/O components 2350 may include output components 2352 and input components 2354. The output components 2352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 2354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 2350 may include biometric components 2356, motion components 2358, environment components 2360, or position components 2362 among a wide array of other components. For example, the biometric components 2356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2358 may include acceleration sensor components (e.g., accelerometer), gravitation sensor components, rotation sensor components (e.g., gyroscope), and so forth. The environment components 2360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2364 operable to couple the machine 2300 to a network 2380 or devices 2370 via a coupling 2382 and a coupling 2372, respectively. For example, the communication components 2364 may include a network interface component or other suitable device to interface with the network 2380. In further examples, the communication components 2364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2370 may be another machine or any of a wide variety of peripheral devices (e.g., a peripheral device coupled via a USB).

Moreover, the communication components 2364 may detect identifiers or include components operable to detect identifiers. For example, the communication components 2364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 2364, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 2316 for execution by the machine 2300, and includes digital or analog communications signals or other intangible media to facilitate communication of such instructions 2316. Instructions 2316 may be transmitted or received over the network 2380 using a transmission medium via a network interface device and using any one of a number of well-known transfer protocols.

"CLIENT DEVICE" in this context refers to any machine 2300 that interfaces to a network 2380 to obtain resources from one or more server systems or other client devices 110. The client device 110 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 2380.

"COMMUNICATIONS NETWORK" in this context refers to one or more portions of a network 2380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 2380 may include a wireless or cellular network and the coupling 2382 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 2316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions 2316 (e.g., code) for execution by a machine 2300, such that the instructions 2316, when executed by one or more processors 2310 of the machine 2300, cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 2312 or a group of processors 2310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 2300) uniquely tailored to perform the configured functions and are no longer general-purpose processors 2310.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 2312 configured by software to become a special-purpose processor, the general-purpose processor 2312 may be configured as respectively different special-purpose processors (e.g., comprising different hardware components) at different times. Software accordingly configures a particular processor 2312 or processors 2310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 2310 that are temporarily configured (e.g., by software) or permanently configured to perform the relevant operations. Whether temporarily or permanently configured, such processors 2310 may constitute processor-implemented components that operate to perform one or more operations or functions described herein. As used herein, "processor-implemented component" refers to a hardware component implemented using one or more processors 2310. Similarly, the methods described herein may be at least partially processor-implemented, with a particular processor 2312 or processors 2310 being an example of hardware. For example, at least some of the operations of a method may be performed by one or more processors 2310 or processor-implemented components. Moreover, the one or more processors 2310 may also operate to support performance of the relevant operations in a "cloud computing" environment or as a "software as a service" (SaaS). For example, at least some of the operations may be performed by a group of computers (as examples of machines 2300 including processors 2310), with these operations being accessible via a network 2380 (e.g., the Internet) and via one or more appropriate interfaces (e.g., an API). The performance of certain of the operations may be distributed among the processors 2310, not only residing within a single machine 2300, but deployed across a number of machines 2300. In some example embodiments, the processors 2310 or processor-implemented components may be located in a single geographic location (e.g., within a home environment, an office environment, or a server farm). In other example embodiments, the processors 2310 or processor-implemented components may be distributed across a number of geographic locations.

"PROCESSOR" in this context refers to any circuit or virtual circuit (a physical circuit emulated by logic executing on an actual processor 2312) that manipulates data values according to control signals (e.g., "commands," "op codes," "machine code," etc.) and which produces corresponding output signals that are applied to operate a machine 2300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 2310 may further be a multi-core processor 2310 having two or more independent processors 2312, 2314 (sometimes referred to as "cores") that may execute instructions 2316 contemporaneously.

What is claimed is:

1. A method comprising:
   identifying, by a mobile device, a virtual item to be simulated;
   generating, using an image sensor of the mobile device, a live video depicting a physical environment comprising a physical wall and a physical ground;
   generating a virtual ground that, corresponds to the physical ground as depicted in the live video;
   projecting, in the live video, a moveable virtual horizontal line that slides along the virtual ground in response to movement of the mobile device;
   detecting, using one or more inertial sensors, movement of the mobile device while the moveable virtual horizontal line is projected in the live video;
   in response to the movement, sliding the moveable virtual horizontal line from a closer position on the virtual ground to a farther position on the virtual ground that is nearer to the physical wall as viewed in the live video on the mobile device;
   storing the farther position of the moveable virtual horizontal line as an intersection of the physical wall and the physical ground;
   generating, on the mobile device, a virtual wall that coincides with the intersection stored at the farther position of the moveable virtual horizontal line;
   generating, on the mobile device, renders of the virtual item on the virtual wall using a virtual camera;
   generating a modified image sequence depicting the renders of the virtual item on the physical wall; and
   displaying the modified image sequence on a display device of the mobile device.

2. The method of claim 1, wherein the virtual item is a planar item and generating the renders of the virtual item comprise: applying a modeling texture associated with the virtual item to generate the renders of the virtual item.

3. The method of claim 1, wherein identifying the physical ground comprises:
   detecting a plurality of image features on the physical ground depicted in the live video.

4. The method of claim 3, wherein the virtual ground is generated to coincide with the plurality of image features detected on the physical ground.

5. The method of claim 1, wherein the virtual wall is generated such that it extends from the intersection perpendicularly from the virtual ground.

6. The method of claim 1, wherein the moveable virtual horizontal line is a bottom side of a vertical plane.

7. The method of claim 1, further comprising:
   tracking image features across images of the live video;
   generating transformation data describing transformations of the image features across images in the live video; and
   continuously updating a position of the virtual camera based on the transformation data.

8. The method of claim 7, wherein the one or more inertial sensors comprise a gyroscope.

9. A mobile device comprising:
   one or more processors;
   a display device;
   an image sensor; and
   a memory storing instructions that, when executed by the one or more processors, cause the mobile device to perform operations comprising:
   identifying a virtual item to be simulated;
   generating, using the image sensor, a live video depicting a physical environment comprising a physical wall and a physical ground;
   generating a virtual ground that corresponds to the physical ground as depicted in the live video;
   projecting, in the live video, a moveable virtual horizontal line that slides along the virtual ground in response to movement of the mobile device;
   detecting, using one or more inertial sensors, movement of the mobile device while the moveable virtual horizontal line is projected in the live video;
   in response to the movement, sliding the moveable virtual horizontal line from a closer position on the virtual ground to a farther position on the virtual ground that is nearer to the physical wall as viewed in the live video on the mobile device;
   storing the farther position of the moveable virtual horizontal line as an intersection of the physical wall and the physical ground;
   generating a virtual wall that coincides with the intersection stored at the farther position of the moveable virtual horizontal line;
   generating renders of the virtual item on the virtual wall using a virtual camera;
   generating a modified image sequence depicting the renders of the virtual item on the physical wall; and
   displaying the modified image sequence on the display device.

10. The mobile device of claim 9, wherein the virtual item is a planar item and generating the renders of the virtual item comprise:
    applying a modeling texture associated with the virtual item to generate the renders of the virtual item.

11. The mobile device of claim 9, wherein identifying the physical ground comprises: detecting a plurality of image features on the physical ground depicted in the live video.

12. The mobile device of claim 11, wherein the virtual ground is generated to coincide with the plurality of image features detected on the physical ground.

13. A machine storage medium embodying instructions that, when executed by a machine, cause the machine to perform operations comprising:
    identifying, on a mobile device, a virtual item to be simulated;

generating, using an image sensor of the mobile device, a live video depicting a physical environment comprising a physical wall and a physical ground;

generating a virtual ground that corresponds to the physical ground as depicted in the live video;

projecting, in the live video, a moveable virtual horizontal line that slides along the virtual ground in response to movement of the mobile device;

detecting, using one or more inertial sensors, movement of the mobile device while the moveable virtual horizontal line is projected in the live video;

in response to the movement, the moveable virtual horizontal line from a closer position on the virtual ground to a farther position on the virtual ground that is nearer to the physical wall as viewed in the live video on the mobile device;

storing the farther position of the moveable virtual horizontal line as an intersection of the physical wall and the physical ground;

generating a virtual wall that coincides with the intersection stored at the farther position of the moveable virtual horizontal line;

generating renders of the virtual item on the virtual wall using a virtual camera;

generating a modified image sequence depicting the renders of the virtual item on the physical wall; and displaying the modified image sequence on a display device of the mobile device.

\* \* \* \* \*